US012142135B2

(12) United States Patent
Yoshida et al.

(10) Patent No.: US 12,142,135 B2
(45) Date of Patent: Nov. 12, 2024

(54) HAPTIC PRESENTATION APPARATUS, FLUID CONTROL APPARATUS, AND FLUID CONTROL METHOD

(71) Applicant: SONY GROUP CORPORATION, Tokyo (JP)

(72) Inventors: Kentaro Yoshida, Tokyo (JP); Hironobu Abe, Tokyo (JP); Masaki Orihashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 185 days.

(21) Appl. No.: 17/755,325

(22) PCT Filed: Oct. 23, 2020

(86) PCT No.: PCT/JP2020/039935
§ 371 (c)(1),
(2) Date: Apr. 27, 2022

(87) PCT Pub. No.: WO2021/090712
PCT Pub. Date: May 14, 2021

(65) Prior Publication Data
US 2022/0406153 A1 Dec. 22, 2022

(30) Foreign Application Priority Data

Nov. 5, 2019 (JP) .................................. 2019-200775
Jul. 3, 2020 (JP) .................................. 2020-115590

(51) Int. Cl.
*G08B 6/00* (2006.01)
*G06F 3/01* (2006.01)

(52) U.S. Cl.
CPC ............... *G08B 6/00* (2013.01); *G06F 3/016* (2013.01)

(58) Field of Classification Search
CPC ........................................................ G06F 3/016
See application file for complete search history.

(56) References Cited

U.S. PATENT DOCUMENTS 5,231,381 A * 7/1993 Duwaer ................ G06F 3/0433
345/174
11,003,286 B2 * 5/2021 Nishida ............... G06F 3/04182
(Continued)

FOREIGN PATENT DOCUMENTS

| JP | 2017-079034 A | 4/2017 |
| JP | 6472109 B1 | 2/2019 |
| WO | 2020/059780 A1 | 3/2020 |

OTHER PUBLICATIONS

International Search Report and Written Opinion of PCT Application No. PCT/JP2020/039935, issued on Dec. 8, 2020, 08 pages of ISRWO.

*Primary Examiner* — Travis R Hunnings
(74) *Attorney, Agent, or Firm* — CHIP LAW GROUP

(57) ABSTRACT

[Object] To provide a technology capable of presenting various haptic sensations to a user.
[Solving Means] A haptic presentation apparatus according to the present technology includes: a first deformable layer; a second deformable layer; and a drive unit. The first deformable layer is positioned on a front surface side. The second deformable layer is positioned inward of the first deformable layer. The drive unit is driven to control outflow and inflow of fluid between a first space and a second space, the first space retaining the fluid between the first deformable layer and the second deformable layer, the second space retaining the fluid inward of the second deformable layer.

19 Claims, 22 Drawing Sheets

(56) References Cited

U.S. PATENT DOCUMENTS

| | | | |
|---|---|---|---|
| 2009/0174687 A1* | 7/2009 | Ciesla | G06F 3/04886 |
| | | | 345/173 |
| 2010/0321330 A1* | 12/2010 | Lim | G06F 1/1626 |
| | | | 345/173 |
| 2010/0321335 A1* | 12/2010 | Lim | G09B 21/004 |
| | | | 345/174 |
| 2011/0007002 A1* | 1/2011 | Tsai | G06F 3/04886 |
| | | | 345/173 |

* cited by examiner

| Surface layer | Hard and soft feeling | Driving of first actuator | Driving of second actuator | Driving of third actuator |
|---|---|---|---|---|
| First deformable layer | Soft | First actuator ≥ Second actuator<br>Third actuator > Second actuator | | |
| First deformable layer + second deformable layer | Hard | Second actuator > First actuator<br>Second actuator ≥ Third actuator | | |

| Surface layer | Hard and soft feeling | Driving of first actuator | Driving of second actuator |
|---|---|---|---|
| First deformable layer | Soft | $\geq 0$ | Off |
| First deformable layer + second deformable layer | Hard | Second actuator > First actuator | |

| Surface layer | Hard and soft feeling | Driving of first actuator | Driving of second actuator |
|---|---|---|---|
| First deformable layer | Soft | Off | >0 |
| First deformable layer + second deformable layer | Hard | >0 | Off |

| Surface layer | Hard and soft feeling | Driving of first actuator | Driving of second actuator | Driving of third actuator |
|---|---|---|---|---|
| First deformable layer | Soft | M | off | L |
| First deformable layer + second deformable layer | Medium | L | M | Off |
| First deformable layer + second deformable layer + third deformable layer | Hard | Off | L | M |

| Surface layer | Hard and soft feeling | Driving of first actuator | Driving of second actuator | Driving of third actuator | Driving of fourth actuator | Driving of fifth actuator | Driving of sixth actuator |
|---|---|---|---|---|---|---|---|
| First deformable layer | Soft | First actuator: H, second actuator: off → First actuator ≥ second actuator | off | H → L/off | off | H → L/off |
| First + second deformable layers | Medium | off | H → L/off | Third actuator: H, fourth actuator: off → Third actuator ≥ fourth actuator | off | H → L/off |
| First + second + third deformable layers | Hard | off | H → L/off | off | H → L/off | Fifth actuator: H, sixth actuator: off → Fifth actuator ≥ sixth actuator |

FIG.25

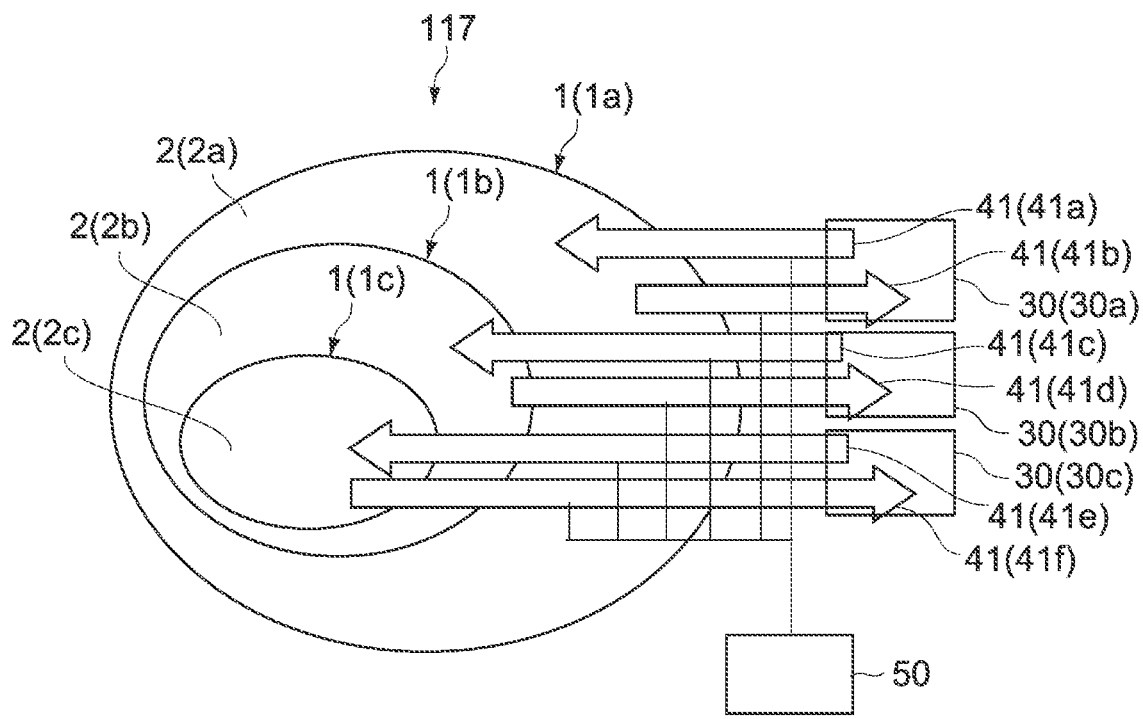

FIG.26

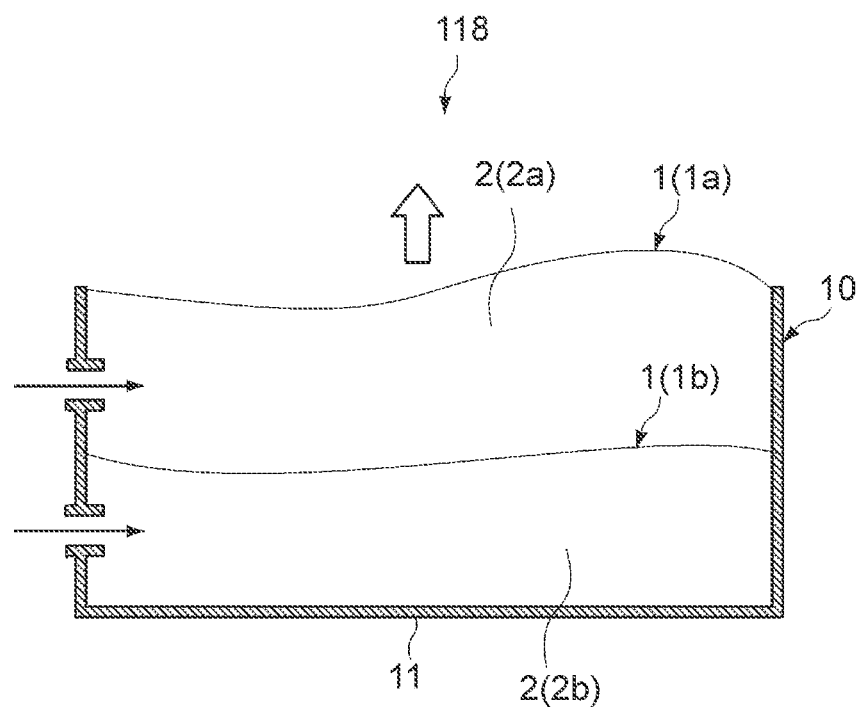
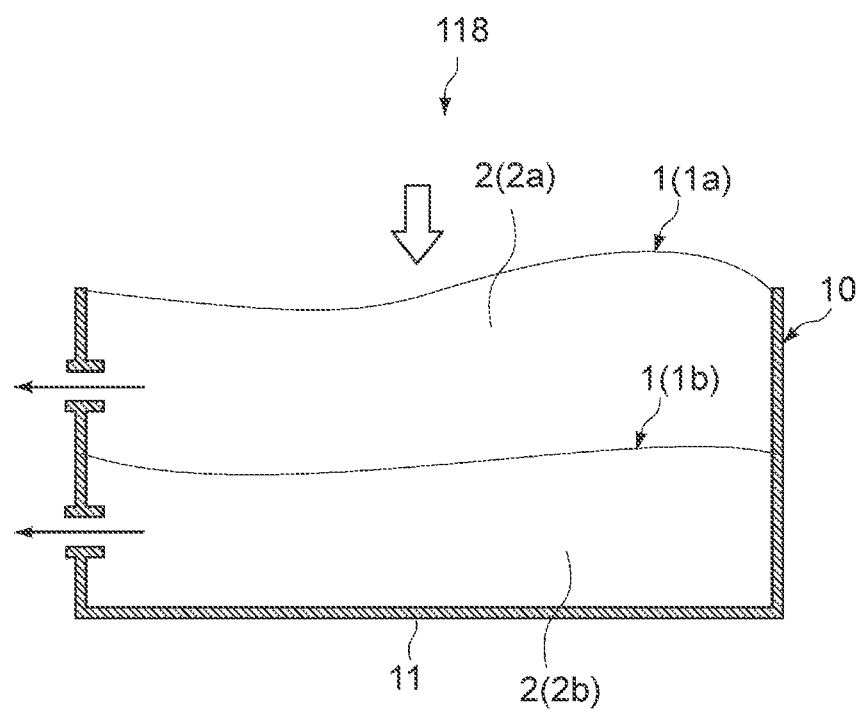
FIG.27

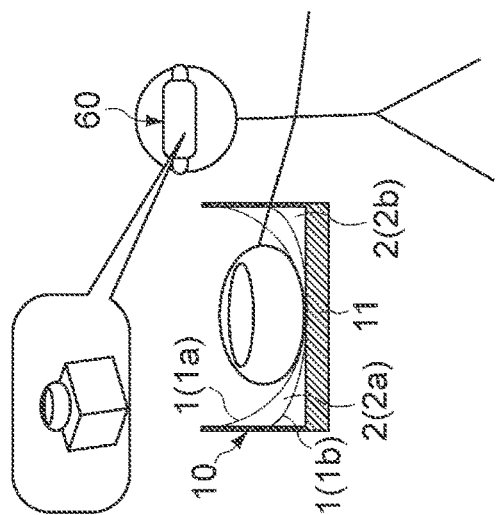
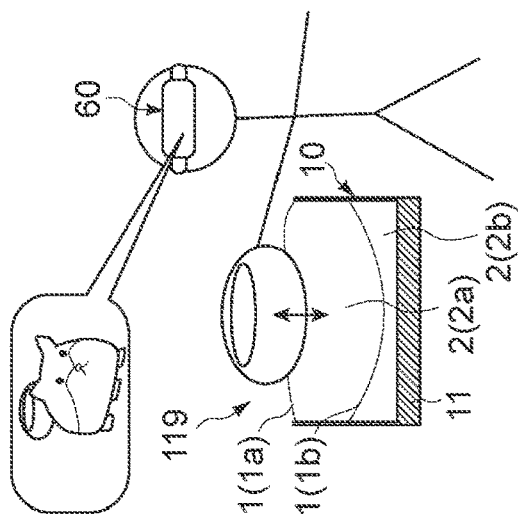
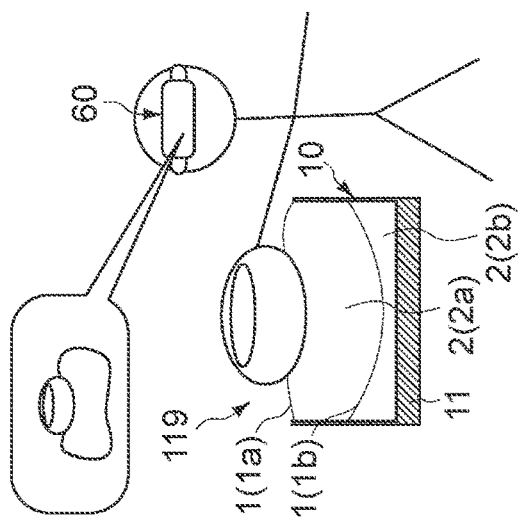
FIG.28

HAPTIC PRESENTATION APPARATUS, FLUID CONTROL APPARATUS, AND FLUID CONTROL METHOD

CROSS REFERENCE TO RELATED APPLICATIONS

This application is a U.S. National Phase of International Patent Application No. PCT/JP2020/039935 filed on Oct. 23, 2020, which claims priority benefit of Japanese Patent Application No. JP 2019-200775 filed in the Japan Patent Office on Nov. 5, 2019 and Japanese Patent Application No. JP 2020-115590 filed in the Japan Patent Office on Jul. 3, 2020. Each of the above-referenced applications is hereby incorporated herein by reference in its entirety.

TECHNICAL FIELD

The present technology relates to a technology of presenting a haptic sensation to a user, such as a haptic presentation apparatus.

BACKGROUND ART

In the past, various haptic presentation apparatuses that present a haptic sensation to a user have been known.

For example, the following Patent Literature 1 discloses a haptic sensation output apparatus of a type used by being worn on a finger. This haptic sensation output apparatus includes: a compression spring that urges a contact material that is to be in contact with a finger from the side opposite to the finger; and a dielectric elastomer that attracts the contact material to the side opposite to the finger side. In this haptic sensation output apparatus, the voltage to be applied to the dielectric elastomer is adjusted to relax and contract the dielectric elastomer to cause the contact material to move, thereby changing the haptic sensation to be given to a finger of the user.

CITATION LIST

Patent Literature

Patent Literature 1: Japanese Patent Application Laid-open No. 2017-79034

DISCLOSURE OF INVENTION

Technical Problem

In such a field, a technology capable of presenting various haptic sensations to a user is desired.

In view of the circumstances as described above, it is an object of the present technology to provide a technology capable of presenting various haptic sensations to a user.

Solution to Problem

A haptic presentation apparatus according to the present technology includes: a first deformable layer; a second deformable layer; and a drive unit.

The first deformable layer is positioned on a front surface side.

The second deformable layer is positioned inward of the first deformable layer.

The drive unit is driven to control outflow and inflow of fluid between a first space and a second space, the first space retaining the fluid between the first deformable layer and the second deformable layer, the second space retaining the fluid inward of the second deformable layer.

As described above, it is possible to present various haptic sensations to a user by forming a deformable layer into a (two or more) multi-stage structure and controlling outflow and inflow of fluid in a plurality of spaces retaining the fluid.

In the haptic presentation apparatus, the drive unit may control outflow and inflow of the fluid to switch a first state and a second state, the first deformable layer and the second deformable layer being separated from each other in the first state, at least part of the second deformable layer and at least part of the second deformable layer being close to each other in the second state.

In the haptic presentation apparatus, the first deformable layer and the second deformable layer may have different hardnesses at least in part.

In the haptic presentation apparatus, the first deformable layer and the second deformable layer may include close portions that are close to each other in the second state and at least the close portion of the first deformable layer and the close portion of the second deformable layer may have different hardnesses.

In the haptic presentation apparatus, the close portion of the second deformable layer may be harder than the close portion of the first deformable layer.

In the haptic presentation apparatus, the close portion of the first deformable layer may be harder than the close portion of the second deformable layer.

In the haptic presentation apparatus, one of the close portions of the first deformable layer and the second deformable layer may have a Young's modulus of 100 MPa or more and the other close portion may have a Young's modulus of less than 100 MPa.

In the haptic presentation apparatus, the first deformable layer and the second deformable layer may have different shapes at least in part.

In the haptic presentation apparatus, the first deformable layer and the second deformable layer may include close portions that are close to each other in the second state and at least the close portion of the first deformable layer and the close portion of the second deformable layer may have different shapes.

In the haptic presentation apparatus, the first deformable layer and the second deformable layer may include close portions that are close to each other in the second state and the first deformable layer and the second deformable layer may have a fitting mechanism for fitting the close portions to each other in the second state.

In the haptic presentation apparatus, the fitting mechanism may include a recessed portion and a projecting portion that fits into the recessed portion, one of the close portions of the first deformable layer and the second deformable layer including the recessed portion, the other close portion including the projecting portion.

The haptic presentation apparatus may further include a latch mechanism that latches the projecting portion to the recessed portion while the projecting portion fits into the recessed portion.

The haptic presentation apparatus may include a lock mechanism that locks the projecting portion to the recessed portion while the projecting portion fits into the recessed portion.

In the haptic presentation apparatus, at least one of the first deformable layer and the second deformable layer may include a temperature adjustment unit capable of adjusting temperature.

In the haptic presentation apparatus, at least one of the first deformable layer and the second deformable layer may include a vibration unit.

The haptic presentation apparatus may further include a sensor unit that acquires information regarding at least one of the first space or the second space.

In the haptic presentation apparatus, the fluid flowing in and out of the first space and the fluid flowing in and out of the second space may have different properties.

A fluid control apparatus according to the present technology includes: a first deformable layer; a second deformable layer; and a drive unit.

The first deformable layer is positioned on a front surface side.

The second deformable layer is positioned inward of the first deformable layer.

The drive unit controls outflow and inflow of fluid between a first space and a second space to switch a first state and a second state, the first space retaining the fluid between the first deformable layer and the second deformable layer, the second space retaining the fluid inward of the second deformable layer, the first deformable layer and the second deformable layer being separated from each other in the first state, at least part of the second deformable layer and at least part of the second deformable layer being close to each other in the second state.

A fluid control method according to the present technology includes:

controlling outflow and inflow of fluid between a first space and a second space, the first space retaining the fluid between a first deformable layer positioned on a front surface side and a second deformable layer positioned inward of the first deformable layer, the second space retaining the fluid inward of the second deformable layer.

A program according to the present technology causes a computer to execute the process of:

controlling outflow and inflow of fluid between a first space and a second space, the first space retaining the fluid between a first deformable layer positioned on a front surface side and a second deformable layer positioned inward of the first deformable layer, the second space retaining the fluid inward of the second deformable layer.

BRIEF DESCRIPTION OF DRAWINGS

FIG. 25 is a diagram showing switching of driving of an actuator.

FIG. 26 is a schematic diagram showing a haptic presentation apparatus according to a fourteenth embodiment.

FIG. 27 is a diagram showing a haptic presentation apparatus according to a first modified example.

FIG. 28 is a diagram showing a haptic presentation apparatus according to a second modified example.

MODE(S) FOR CARRYING OUT THE INVENTION

Embodiments of the present technology will be described below with reference to the drawings.

First Embodiment

<Overall Configuration and Configurations of Respective Units>

Figure 1:
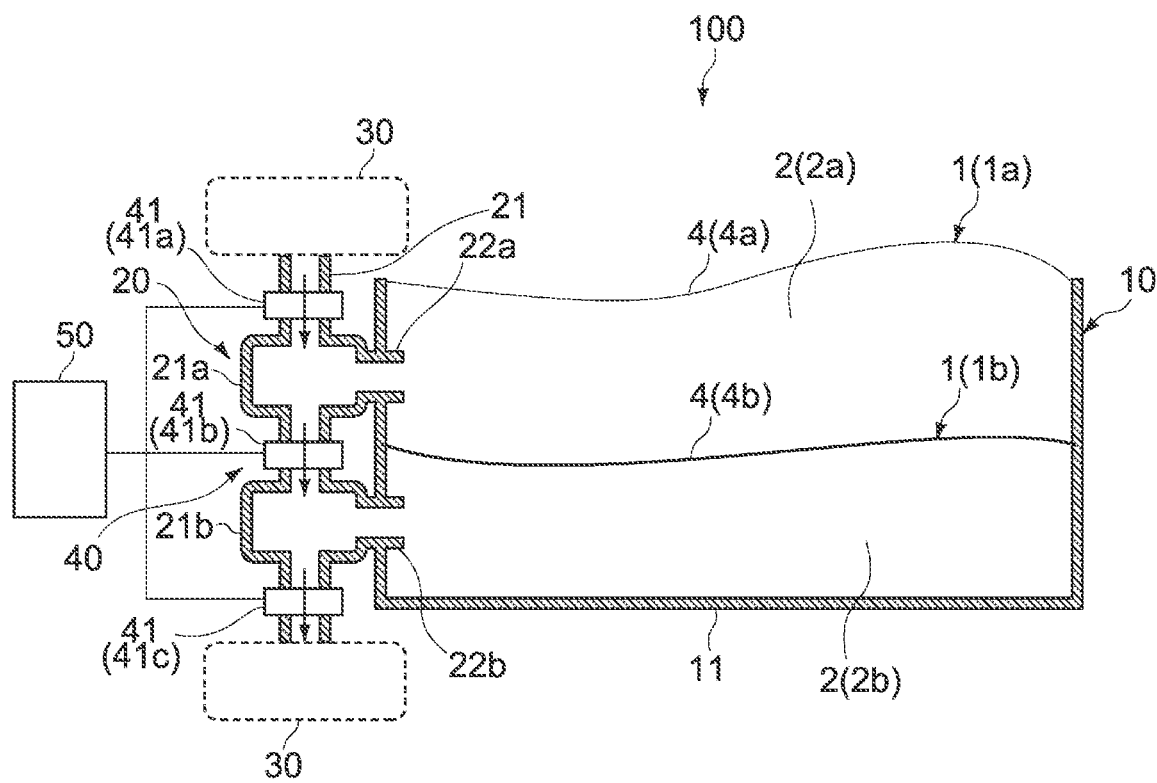
FIG. 1 is a schematic diagram showing a configuration of an entire haptic presentation apparatus according to a first embodiment of the present technology.

FIG. 1 is a schematic diagram showing a configuration of an entire haptic presentation apparatus 100 according to a first embodiment of the present technology. As shown in FIG. 1, the haptic presentation apparatus 100 includes a casing 10, a first deformable layer 1a and a second deformable layer 1b provided inside the casing 10, and a channel portion 20 provided outside the casing 10. Further, the haptic presentation apparatus 100 includes a supply source 30 capable of supplying fluid to the channel portion 20, a drive unit 40 provided to the channel portion 20, and a control device 50 that controls the drive unit 40.

The casing 10 is formed into a cylindrical shape including a bottom portion 11. The casing 10 is formed into a shape such as a cylindrical shape and a square cylindrical shape.

The first deformable layer 1a and the second deformable layer 1b are each formed into a thin film shape and formed to be deformable. As the material used for the first deformable layer 1a and the second deformable layer 1b, typically, various types of rubber such as silicon rubber and natural rubber are used in consideration of elasticity. Note that the first deformable layer 1a and the second deformable layer 1b may be formed of a material other than rubber, such as a resin, metal, and wood.

The entire outer periphery portion of each of the first deformable layer 1a and the second deformable layer 1b is fixed to the inner wall of the casing 10 with an adhesive or the like. The first deformable layer 1a is disposed on a front surface side. The second deformable layer 1b is disposed at a position inward (lower layer side) of the first deformable layer 1a with a predetermined distance from the first deformable layer 1a. The front surface of the first deformable layer 1a is exposed to the outside, and this front surface is in contact with part of the user's body, such as a hand and a finger.

By providing the two deformable layers 1 to the casing 10, the internal space of the casing 10 is divided into two spaces of a first space 2a and a second space 2b. The first space 2a is a space surrounded by the first deformable layer 1a, the second deformable layer 1b, and the wall portion on the upper part of the casing 10, and is capable of retaining fluid therein. The second space 2b is a space surrounded by the second deformable layer 1ba, the bottom portion 11 of the casing 10, and the wall portion on the lower part of the casing 10 (space inward (lower layer side) of the second deformable layer 1b), and is capable of retaining fluid therein.

The first space 2a and the second space 2b each include an inflow/outflow port capable of flowing in and out fluid, each have no holes or the like in other portions, and are each a sealed space. The fluid retained in the first space 2a and the second space 2b may be, for example, a gas such as air and helium or a liquid such as water and oil. Note that the type of fluid is not particularly limited, and various types of fluid can be used.

The channel portion 20 is configured to be capable of allowing fluid to flow between the supply source 30, the first space 2a, and the second space 2b. The channel portion 20 includes a pipe 21 having both ends connected to the supply source 30. Further, the channel portion 20 includes a first connecting pipe 22a that connects the pipe 21 and the first space 2a to each other and a second connecting pipe 22b that connects the pipe 21 and the second space 2b to each other.

The pipe 21 includes, therein, a channel through which fluid flows. Further, the first connecting pipe 22a includes an inflow/outflow port for causing fluid to flow into the first space 2a and flow out from the first space 2a. Similarly, the second connecting pipe 22b includes an inflow/outflow port for causing fluid to flow into the second space 2b and flow out from the first space 2a.

A through hole penetrating the casing 10 is provided at a position corresponding to the first space 2a in the upper part of the casing 10, and one end side of the first connecting pipe 22a is inserted into and fixed to this through hole. Similarly, a through hole penetrating the casing 10 is provided at a position corresponding to the second space 2b in the lower part of the casing 10, and one end side of the second connecting pipe 22b is inserted into and fixe to this through hole.

The pipe 21 includes a first connecting portion 21a at a position to be connected to the first connecting pipe 22a and a second connecting portion 21b at a position to be connected to the second connecting pipe 22b. The first connecting portion 21a and the second connecting portion 21b are each formed to have a diameter larger than those of other portions in the pipe 21.

A through hole penetrating the pipe 21 in the radial direction is provided to the first connecting portion 21a, and the other end side of the first connecting pipe 22a is inserted into and fixed to this through hole. Similarly, a through hole penetrating the pipe 21 in the radial direction is provided to the second connecting portion 21b, and the other end side of the second connecting pipe 22b is inserted into and fixed to this through hole.

Figure 3:
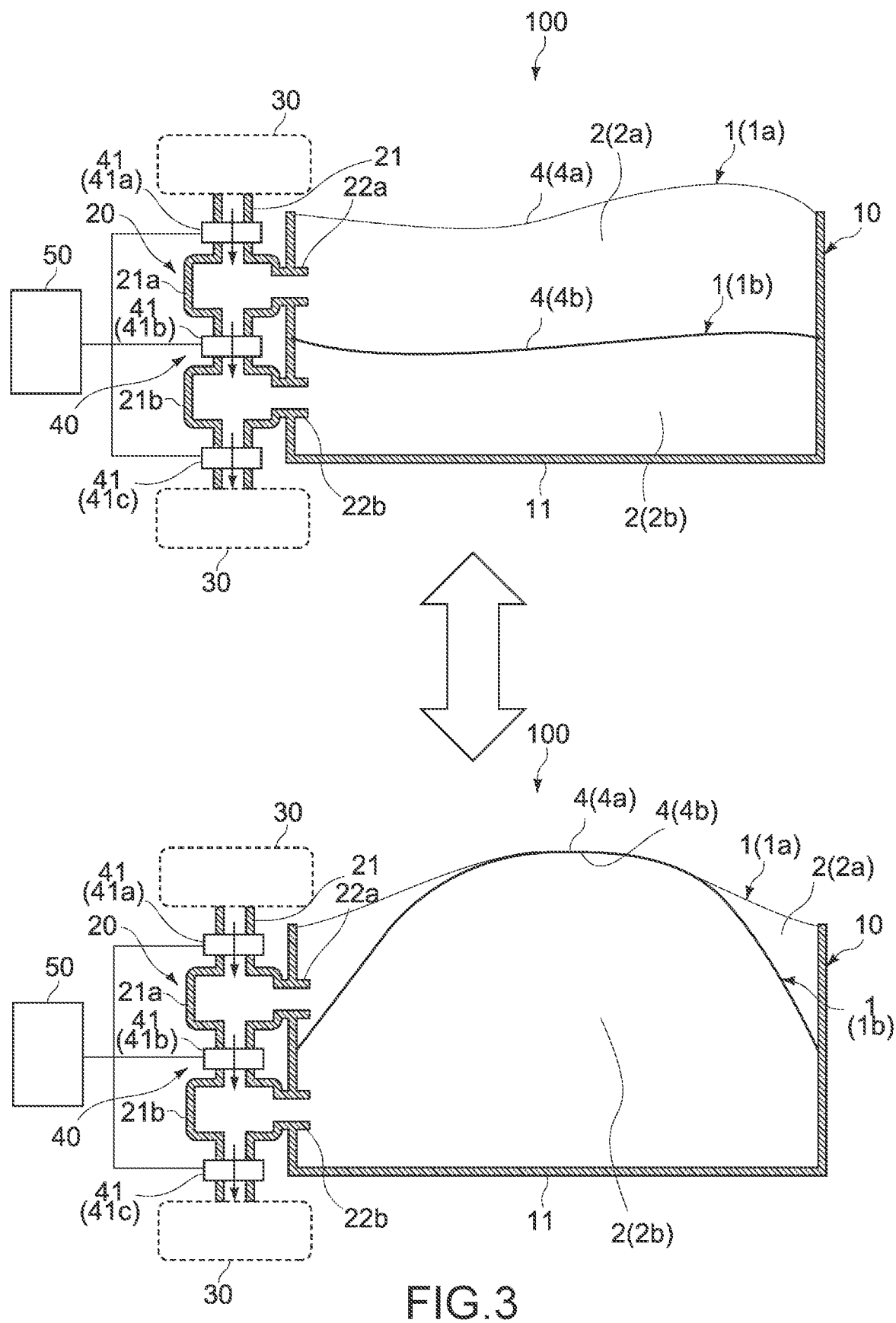
FIG. 3 is a diagram showing how a separated state and a close state are switched in the haptic presentation apparatus according to the first embodiment.

The drive unit 40 is driven in accordance with the control of the control device 50 (control unit) to independently control outflow and inflow of fluid in the first space 2a and the second space 2b. As a result, as shown in FIG. 3, the drive unit 40 switches a separated state (first state) and a close state (second state), the first deformable layer 1a and the second deformable layer 1b being separated from each other in the separated state, at least part of the first deformable layer 1a and at least part of the second deformable layer 1b being close to each other in the close state.

The drive unit 40 includes a first actuator 41a, a second actuator 41b, and a third actuator 41c provided in the channel of the pipe 21.

The first actuator 41a is disposed in a channel between the supply source 30 and the first connecting portion 21a, and this first actuator 41a is positioned between the supply source 30 and the first space 2a. The second actuator 41b is disposed between the first connecting portion 21a and the second connecting portion 21b, and this second actuator 41b is positioned between the first space 2a and the second space 2b. The third actuator 41c is disposed in a channel between the second connecting portion 21b and the supply source 30, and this third actuator 41c is positioned between the second space 2b and the supply source 30.

In the first embodiment, the actuator 41 is of a type that generates a pressure gradient in one direction. In the first embodiment, the first actuator 41a generates a pressure gradient from the side of the supply source 30 toward the side of the first space 2a, and the second actuator 41b generates a pressure gradient from the side of the first space 2a toward the side of the second space 2b. Further, the third actuator 41c generates a pressure gradient from the side of the second space 2b toward the side of the supply source 30.

Figure 2:
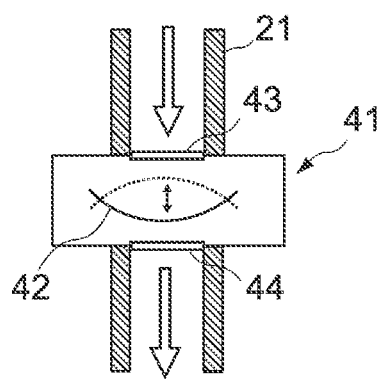
FIG. 2 is a diagram showing an example of an actuator.

FIG. 2 is a diagram showing an example of an actuator 41. In the example shown in FIG. 2, as an example of the actuator 41, a piezoelectric diaphragm pump is shown. This diaphragm pump includes a piezoelectric diaphragm 42 therein. The piezoelectric diaphragm 42 generates a pressure gradient in one direction by vibrating in response to the applied voltage, thereby making it possible to cause fluid to flow.

In the piezoelectric diaphragm pump, check valves 43 and 44 for preventing backflow are provided on the outflow side and outflow side of fluid. Note that the check valve 43 on the inflow side may be omitted.

This piezoelectric diaphragm pump is capable of generating a pressure gradient in one direction when a voltage is applied and allowing fluid to flow in the direction. Meanwhile, in the case where the piezoelectric diaphragm is not vibrating when no voltage is applied, the piezoelectric diaphragm is capable of causing, when a pressure gradient is generated in the backflow direction (e.g., the pressure in the second space 2b is higher than that in the first space 2a), fluid to flow backward in accordance with the pressure gradient.

In the first embodiment, the actuator 41 is of a type that generates a pressure gradient in one direction, but the actuator 41 may be of a type that generates a pressure gradient in both direction. Note that as the actuator 41, any type of actuator 41, such as a fan, a blower, and a pump, may be used. Further, the actuator 41 may be of a turbo type that causes an impeller to rotate, a positive displacement type that causes fluid of a certain space volume to move by reciprocating motion or rotational motion, or other special types such as a configuration including compressed fluid and a solenoid valve.

The supply source 30 is configured to be capable of supplying fluid to the first space 2a and the second space 2b via the channel portion 20. The supply source 30 shown in FIG. 1 is shown separately in two for convenience, but the supply source 30 shown in FIG. 1 is the same. In the case where fluid to be used is air, the supply source 30 may be, for example, a compressed air pressure source such as an air compressor. Further, in the case where fluid to be used is a liquid such as water or a special gas other than air (e.g., helium), the supply source 30 may be a tank capable of storing the fluid. Note that in the case where fluid to be used is air, the supply source 30 can be omitted. In this case, both ends (or one end) of the pipe 21 are released to the atmosphere, and the atmosphere is used as the supply source 30 as it is (for this reason, the supply source 30 is shown by a broken line in the figure).

The control device 50 includes a control unit, a storage unit, a communication unit, and the like. The control unit executes various operations on the basis of various programs stored in the storage unit, and integrally controls the respective units of the haptic presentation apparatus 100. The control unit drives the drive unit 40 in accordance with the program stored in storage unit to independently control outflow and inflow of fluid in the first space 2a and the second space 2b.

The control unit is realized by hardware or a combination of hardware and software. The hardware is configured as part or all of the control unit. Examples of this hardware include a CPU (Central Processing Unit), a DSP (Digital Signal Processor), an FPGA (Field Programmable Gate Array), an ASIC (Application Specific Integrated Circuit), or those similar thereto.

The storage unit includes a non-volatile memory for storing various programs necessary for processing of the control unit and various types of data, a volatile memory used as a work area of the control unit. The communication unit is configured to be capable of communicating with another apparatus other than the haptic presentation apparatus 100.

Note that the control device 50 may be a device dedicated to the haptic presentation apparatus 100 (e.g., a micro controller), or another general-purpose device such as a PC (Personal Computer: a desktop PC, a laptop PC, a tablet PC, a server device on a network, or the like) and a mobile phone (including a smartphone).

<Hardnesses of First Deformable Layer 1a and Second Deformable Layer 1b>

Next, the hardnesses of the first deformable layer 1a and the second deformable layer 1b will be described. In the first embodiment, the first deformable layer 1a and the second deformable layer 1b have different hardnesses, and the second deformable layer 1b is configured to be harder than the first deformable layer 1a. Note that in the description of each embodiment, the "hardness" means the magnitude of the deformation amount (stretch difficulty in the in-plane direction) in the in-plane direction of the deformable layer 1 when a predetermined pressure difference has occurred in the up-and-down direction of the deformable layer 1.

Here, the hardnesses of the first deformable layer 1a and the second deformable layer 1b can differ due to one of 1. Young's modulus of the material used for the deformable layer 1 and 2. the thickness of the deformable layer 1.

1. The first deformable layer 1a and the second deformable layer 1b are formed of materials having different Young's moduli.

For example, while the first deformable layer 1a and the second deformable layer 1b are formed to have the same thickness (which may differ), the first deformable layer 1a and the second deformable layer 1b have different hardnesses (harder as the Young's modulus is higher) because they are formed of materials having different Young's moduli.

In the first embodiment, the second deformable layer 1b is harder than the first deformable layer 1a. In this case, for example, the first deformable layer 1a is formed of rubber such as silicon rubber and the second deformable layer 1b is formed of rubber, a resin, metal, wood, or the like having a Young's modulus higher than that of the first deformable layer 1a.

Note that on the contrary, the first deformable layer 1a may be formed to be harder than the second deformable layer 1b. In this case, for example, the second deformable layer 1b is formed of rubber such as silicon rubber and the first deformable layer 1a is formed of rubber, a resin, metal, wood, or the like having a Young's modulus higher than that of the first deformable layer 1a.

2. The first deformable layer 1a and the second deformable layer 1b have different thicknesses.

For example, while the first deformable layer 1a and the second deformable layer 1b are formed of the same material (which may differ), the first deformable layer 1a and the second deformable layer 1b have different hardnesses (harder as the thickness is larger) because the first deformable layer 1a and the first deformable layer 1a have different thicknesses.

In the first embodiment, the second deformable layer 1b is harder than the first deformable layer 1a. In this case, the second deformable layer 1b is formed to be thicker than the first deformable layer 1a.

Note that on the contrary, the first deformable layer 1a may be formed to be harder than the second deformable layer 1b. In this case, for example, the first deformable layer 1a is formed to be thicker than the second deformable layer 1b.

<Description of Operation>

Figures 4, 5:
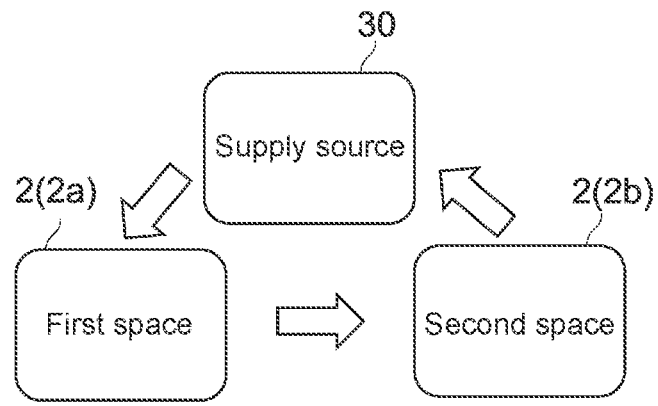
FIG. 4 is a diagram showing switching of driving of three actuators.
FIG. 5 is a diagram showing how fluid circulates between a supply source, a first space, and a second space.

Next, the operation of the haptic presentation apparatus 100 will be described. FIG. 3 is a diagram showing how a separated state and a close state are switched. FIG. 4 is a diagram showing switching of driving of the three actuators 41. FIG. 5 is a diagram showing how fluid circulates between the supply source 30, the first space 2a, and the second space 2b.

Note that although the main body that controls fluid is described as the control unit in the description of operation, this control of fluid by the control unit is executed by driving the drive unit 40 (the main body that controls fluid may be replaced with the drive unit 40).

As shown in FIG. 3, the control unit of the control device 50 controls outflow and inflow of fluid in the first space 2a and the second space 2b to switch a separated state and a close state, the first deformable layer 1a and the second deformable layer 1b being separated from each other in the separated state, at least part of the first deformable layer 1a and at least part of the second deformable layer 1b being close to each other in the close state.

Note that the case where the first deformable layer 1a and the second deformable layer 1b (layers adjacent to each other) are "close" to each other includes a case where the back surface (inside) of the first deformable layer 1a and the front surface (outside) of the second deformable layer 1b are in contact with each other. Further, the "close" includes a case where the first deformable layer 1a and the second deformable layer 1b approach each other to the extent that a user feels that the haptic sensation has changed when he/she has touched the front surface (outside) of the first deformable layer 1a even in the case where the back surface of the first deformable layer 1a and the front surface of the second deformable layer 1b are separated from each other to some extend (at the closest position to each other).

First, the operation when the control unit switches the separated state to the close state will be described (upper side of FIG. 3->lower side of FIG. 3). In this case, the control unit drives the second actuator 41b more strongly than the first actuator 41a and drives the third actuator 41b with a strength equal to or less than that of the second actuator 41c (see FIG. 4).

At this time, the pressure in the first space 2a is a negative pressure, and the pressure in the second space 2b is a positive pressure. Then, the fluid in the first space 2a moves to the second space 2b via the channel portion 20 (see FIG. 5), the first space 2a expands, and the first space 2a contracts. At this time, while the second deformable layer 1b extends in the plane direction, the portion in the vicinity of the center of the second deformable layer 1b is pushed up by the fluid in the second space 2b to be close to (in contact with) the first deformable layer 1a (see the lower side of FIG. 3). As a result, the separated state is switched to the close state.

Note that in the description of the embodiment, a portion where the first deformable layer 1a and the second deformable layer 1b (layers adjacent to each other) are close to each other on the close state will be referred to as the close portion 4. In the example shown in FIG. 3, the close portion 4 refers to a region in the vicinity of the center including the center in the plane direction in the first deformable layer 1a and the second deformable layer 1b.

In the close state, the two layers of the first deformable layer 1a and the second deformable layer 1b are overlapped with each other in the close portion 4. As a result, the user's sensation for flexibility in the close portion 4 changes, and the user feels that the close portion 4 is harder than before. In particularly, in the first embodiment, since the second deformable layer 1b is formed to be harder than the first deformable layer 1a, the user feels that the front surface of the first deformable layer 1a that has been soft has become hard in the close portion 4. That is, in the first embodiment, since the second deformable layer 1b is formed to be harder than the first deformable layer 1a, it is possible to present a wide dynamic range of flexibility sensation regarding the user's haptic sensation.

Note that the control unit is capable of fine-adjusting the flexibility sensation to be presented to a user in accordance with how strongly the second actuator 41b is caused to vibrate than the third actuator 41c when switching the separated state to the close state.

Next, the operation when the control unit switches the close state to the separated state will be described (lower side of FIG. 3->upper side of FIG. 3). In this case, the control unit drives the first actuator 41a with a strength equal to or more than that of the second actuator 41b and drives the third actuator 41c more strongly than the second actuator 41b.

At this time, the pressure in the first space 2a is a positive pressure and the pressure in the second space 2b is a negative pressure. Then, the fluid from the supply source 30 is supplied to the first space 2a via the channel portion 20, and the fluid in the second space 2b is returned to the supply source 30 via the channel portion 20 (see FIG. 5). As a result, the first space 2a expands and the second space 2b contracts. At this time, the second deformable layer 1b is separated from the first deformable layer 1a and returns to a substantially horizontal state while contracting in the plane direction (see the upper side of FIG. 3). As a result, the close state is switched to the separated state.

In the separated state, the two layers of the first deformable layer 1a and the second deformable layer 1b are totally separated from each other. As a result, the user's sensation for flexibility in the close portion 4 changes, and the user feels that the close portion 4 is softer than before. In particular, in the first embodiment, since the second deformable layer 1b is formed to be harder than the first deformable layer 1a, the user feels that the front surface of the first deformable layer 1a that has been hard has become soft in the close portion 4. That is, in the first embodiment, since the second deformable layer 1b is formed to be harder than the first deformable layer 1a, it is possible to present a wide dynamic range of flexibility sensation regarding the user's haptic sensation.

Effect, Etc

Next, the operation of the first embodiment will be described, but each Comparative Example to be compared with the first embodiment will be described before the description of the operation.

Figure 6:
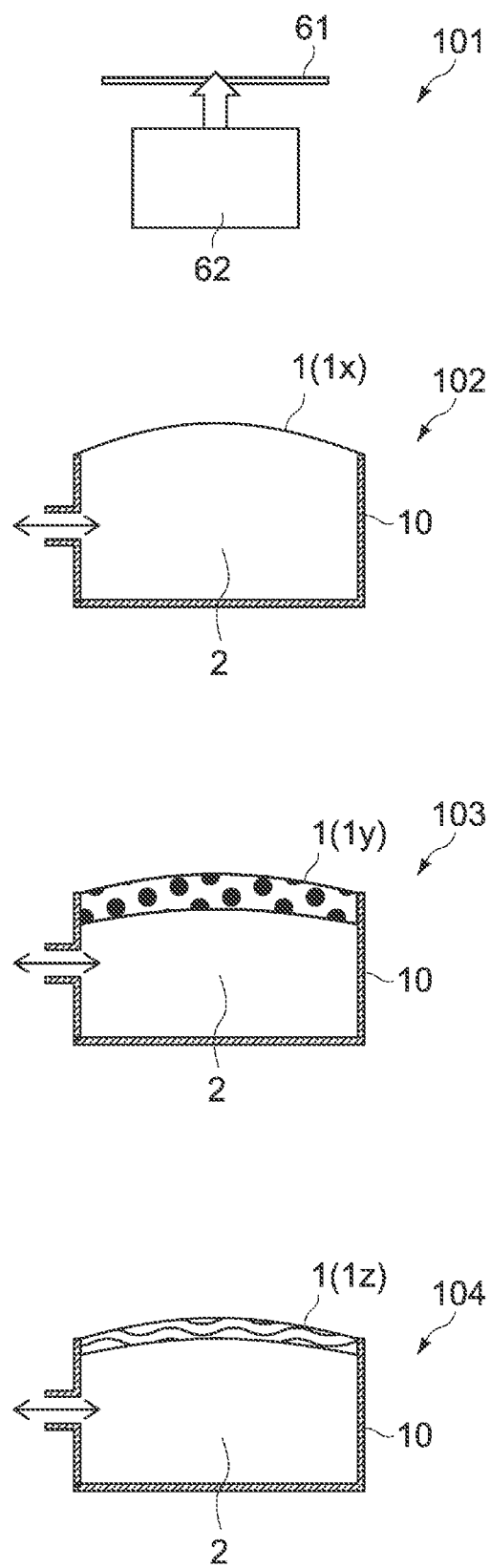
FIG. 6 is a diagram showing respective Comparative Examples.

FIG. 6 is a diagram showing each Comparative Example. Four diagrams in FIG. 6 show a First Comparative Example, a Second Comparative Example, a Third Comparative Example, a Fourth Comparative Example in order from the top.

A haptic presentation apparatus 101 according to the First Comparative Example is an apparatus of a type that presents a haptic sensation to a user by a reaction force. This haptic presentation apparatus 101 includes a contact portion 61 to be in contact with a user and a reaction force generation unit 62 that generates a reaction force. The contact portion 61 is formed of, for example, a hard material such as a resin. The reaction force generation unit 62 presents a pseudo-flexibility sensation to a user by generating a reaction force using torque or the like caused by rotation of a motor, for example.

In the First Comparative Example, since the hardness of the contact portion 61 itself cannot be changed, there is a problem that the dynamic range of flexibility sensation that can be presented to a user is narrow. In particular, in the First Comparative Example, there is a problem that it is difficult to make a user feel soft because the contact portion 61 itself is hard.

A haptic presentation apparatus 102 according to the Second Comparative Example is an apparatus of a type that presents a haptic sensation to a user by controlling outflow and inflow of fluid in a space 2 in the casing 10 to expand and contract the deformable layer 1, similarly to the first embodiment.

However, in this Second Comparative Example, a deformable layer 1x includes one layer and the space 2 for retaining fluid includes only one space, unlike the first embodiment. For this reason, there is a problem that the dynamic range of flexibility sensation that can be presented to a user is narrow. In particular, in the Second Comparative Example, the deformable layer 1x needs to be expanded and contracted, and there is a problem that it is difficult to make a user feel hard because the deformable layer 1x itself is generally soft.

A haptic presentation apparatus 103 according to the Third Comparative Example is an apparatus of a type that uses particle jamming. This Third Comparative Example has a configuration substantially similar to that in the Second Comparative Example, but particles that generate friction are included in a deformable layer 1y in the third modified example.

In the Third Comparative Example, the deformable layer 1y is expanded and contracted by controlling outflow and inflow of fluid in the space 2, so that the distance between particles on which the frictional force acts is changed. Since the distance between particles is larger in the state where the deformable layer 1y is stretched, the frictional force between particles is weakened and the deformable layer 1y is softened. Meanwhile, since the distance between particles is smaller in the state where the deformable layer 1y is contracted, a strong frictional force is generated between particles and the deformable layer 1y becomes harder than when the deformable layer 1y is stretched (particle jamming). In the Third Comparative Example, this relationship is used and a flexibility sensation is presented to a user.

In this Third Comparative Example, a hardness that does not deform with respect to a force exceeding the static friction coefficient between particles cannot be realized, and therefore, there is a problem that the dynamic range of flexibility sensation that can be presented to a user is narrow. Further, there is also a problem that it is technically difficult to cause the deformable layer 1y uniformly include particles. Further, in the Third Comparative Example, it is necessary to cause the deformable layer 1y to include certain particles in order to present a required flexibility sensation and there is a problem that it is difficult to make the deformable layer 1 thinner.

A haptic presentation apparatus 104 according to the Fourth Comparative Example is an apparatus of a type that uses sheet jamming using a sheet such as cloth. In this Fourth Comparative Example, a plurality of sheets that generates friction with each other is laminated to from a deformable layer 1z.

In the Fourth Comparative Example, the deformable layer 1z is expanded and contracted by controlling outflow and inflow of fluid in the space 2, so that the distance between the surfaces of sheets on which a frictional force acts is changed. Since the distance between the surfaces of sheets is larger in the state where the deformable layer 1z is stretched, the frictional force between the sheets is weakened and the deformable layer 1 is softened. Meanwhile, since the distance between the surfaces of sheets is smaller in the state where the deformable layer 1z is contracted, a strong frictional force is generated between the surfaces and the deformable layer 1z is harder than when the deformable layer 1z is stretched (sheet jamming).

Also in this Fourth Comparative Example, there is a problem that the dynamic range of flexibility sensation that can be presented to a user is narrow. For example, it is necessary to form the sheet itself so as not to expand and contract in order to make the deformable layer 1z hard, and therefore, there is a problem that it is difficult to present softness to a user.

Meanwhile, in the first embodiment, the deformable layer 1 has a (2 or more) multi-stage structure, and outflow and inflow of fluid is controlled in the plurality of spaces 2 retaining the fluid. As a result, it is possible to present various changes of a haptic sensation including a flexibility sensation to a user.

In particular, in the first embodiment, it is possible to present a wide dynamic range of flexibility sensation to a user by switching the separated state and the close state. For example, it is possible to achieve a softness that greatly deforms along the user's finger to a hardness that does not deform even when strongly pressed. That is, in the first embodiment, it is possible to solve the problem that the dynamic range of flexibility sensation is narrow in each Comparative Example.

Further, in the first embodiment, also the problem that it is difficult to reduce the thickness as in the Third Comparative Example (particle jamming) can be solved. Note that since it is necessary to make the deformable layer 1 or the like have a multi-layer structure in the first embodiment, a certain thickness is required as a whole, but the thickness is smaller than that of the deformable layer 1 of a particle jamming type.

Further, since the second deformable layer 1b is formed to be harder than the first deformable layer 1a in the first embodiment, it is possible to present a wider dynamic range of flexibility sensation.

Note that although the case where the second deformable layer 1b is formed to be harder than the first deformable layer 1a has been described in the first embodiment, the first deformable layer 1a and the second deformable layer 1b may be formed to have the same hardness. Also in this case, since the first deformable layer 1a and the second deformable layer 1b are overlapped with each other in the close portion 4 in the close state, it is possible to appropriately present a wide dynamic range of flexibility sensation to a user.

Further, on the contrary, the first deformable layer 1a may be formed to be harder than the second deformable layer 1b. In this case, although the dynamic range of a flexibility sensation to be presented to a user is slightly narrowed, it is possible to fine-adjust the flexibility sensation.

In the first embodiment, the case where the deformable layer 1 includes two layers of the first deformable layer 1a and the second deformable layer 1b and the space 2 includes two spaces of the first space 2a and the second space 2b has been described. Meanwhile, the haptic presentation apparatus 100 may be configured such that the deformable layer 1 includes three or more layers and the space 2 includes three or more spaces. In this case, the deformable layer 1 located in the lower layer may be configured to be harder. On the contrary, the deformable layer 1 located on the upper layer may be configured to be harder.

Note that in the first embodiment, as shown in FIG. 5, fluid control of a circulation type in which fluid circulates in the order of the supply source 30->the first space 2a->the second space 2b->the supply source 30-> . . . is adopted. Meanwhile, on the contrary, fluid control of a circulation type in which fluid circulates in the order of the supply source 30->the second space 2b->the first space 2a->the supply source 30-> . . . may be adopted. In this case, the first actuator 41a, the second actuator 41b, and the third actuator 41c are disposed in the orientation opposite to the orientation shown in FIG. 1. In the case where fluid control of a circulation type is adopted, since the number of actuators 41 is only the number of spaces 2+1, the cost can be reduced.

Second Embodiment

Next, a second embodiment of the present technology will be described. Note that in the description of the second embodiment and subsequent embodiments, the respective units having the same configuration and function will be denoted by the same reference symbols and description thereof will be omitted or simplified.

Figure 7:
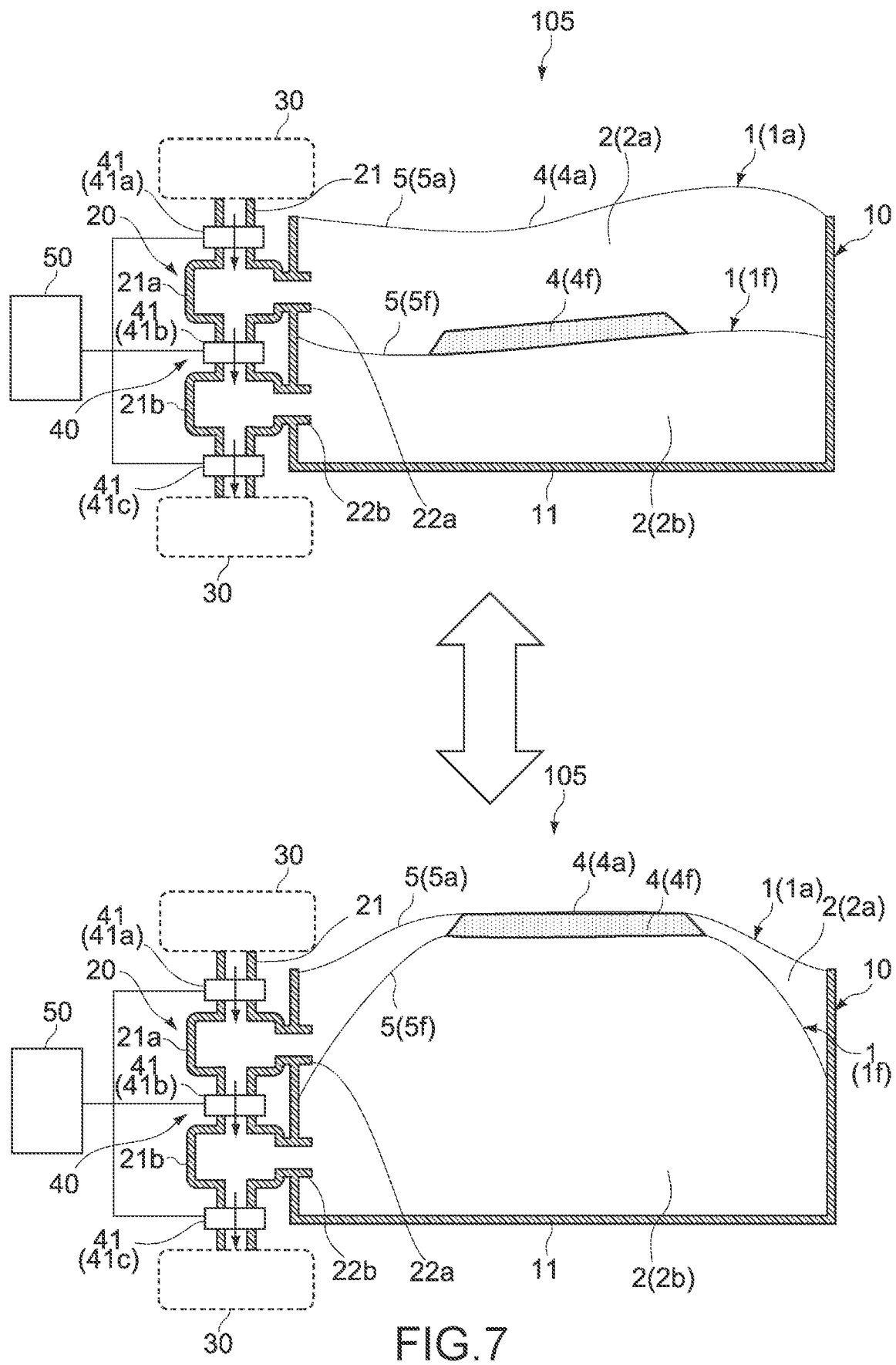
FIG. 7 is a diagram showing how a separated state and a close state are switched in a haptic presentation apparatus according to a second embodiment.

FIG. 7 is a diagram showing how the separated state and the close state are switched in a haptic presentation apparatus 105 according to the second embodiment.

In the above-mentioned first embodiment, the case where the hardness of the entire second deformable layer 1b is harder than the hardness of the entire first deformable layer 1a has been described. Meanwhile, the main part that contributes to the change in flexibility sensation in the first deformable layer 1a and the second deformable layer 1b is the close portion 4. Therefore, the first deformable layer 1a and the second deformable layer 1b do not necessarily need to have different hardnesses as a whole, and the first deformable layer 1a and the second deformable layer 1b only need to have different hardnesses at least in the close portion 4.

In the second embodiment, the hardness of the close portion 4 differs in the first deformable layer 1a and a second deformable layer 1f, and the portions other than the close portion 4 have the same hardness (which may differ). Therefore, this point will be mainly described. Note that in the description of each embodiment, the peripheral portion of the close portion 4 excluding the close portion 4 in the first deformable layer 1a and the second deformable layer 1f will be referred to as the peripheral portion 5 (non-close portion).

The first deformable layer 1a in the second embodiment has a configuration similar to that of the first deformable layer 1a in the first embodiment. For example, considering elasticity, the entire first deformable layer 1a is formed of various types of rubber such as silicon rubber and natural rubber. Note that in the first deformable layer 1a, a close portion 4a and the peripheral portion 5a have the same hardness.

Meanwhile, the close portion 4f of the second deformable layer 1f in the second embodiment is formed to be harder than the first deformable layer 1a, and a peripheral portion 5f has the same hardness as that of the first deformable layer 1a (which may differ). Note that the close portion 4f of the second deformable layer 1f is formed to be harder than the peripheral portion 5f of the second deformable layer 1f.

The peripheral portion 5f of the second deformable layer 1f is formed of, for example, various types of rubber such as silicon rubber and natural rubber, considering elasticity. Here, when the second deformable layer 1f is close to the first deformable layer 1a in the close state, the second deformable layer 1f needs to be stretched to some extent. Meanwhile, in the second embodiment, the close portion 4f of the second deformable layer 1f is relatively hard, and the second deformable layer 1f is difficult to stretch in the plane direction as a whole. Therefore, it is effective use rubber or the like having high elasticity for the peripheral portion 5f of the second deformable layer 1f.

The close portion 4f of the second deformable layer 1f is formed of, for example, rubber, a resin, metal, or wood having a Young's modulus higher than that of the first deformable layer 1a (than that of the peripheral portion 5f of the second deformable layer 1f). Alternatively, the thickness of the close portion 4f of the second deformable layer 1f is larger than the thickness of the close portion 4a of the first deformable layer 1a (than the thickness of the peripheral portion 5f of the second deformable layer 1f). Note that although the close portion 4f of the second deformable layer 1f is thick in the example shown in FIG. 7, this portion does not necessarily need to be thick as long as the close portion 4f of the second deformable layer 1f is harder than the first deformable layer 1a.

Also the second embodiment has effects similar to those in the first embodiment. For example, by switching the separated state and the close state, it is possible to present a wide dynamic range of flexibility sensation to a user.

In the second embodiment, the case where the close portion 4f of the second deformable layer 1f is formed to be harder than the close portion 4a of the first deformable layer 1a has been described. Meanwhile, on the contrary, the close portion 4a of the first deformable layer 1a may be formed to be harder than the close portion 4f of the second deformable layer 1f.

Here, of the close portion 4a of the first deformable layer 1a and the close portion 4f of the second deformable layer 1f, the harder close portion 4 may be formed of a material having a Young's modulus of 100 MPa or more (e.g., relatively hard rubber). In this case, the softer close portion 4 may be formed of a material having a Young's modulus of less than 100 MPa.

For example, in the case where the hardness of the close portion 4f of the second deformable layer 1f is a Young's modulus of 100 MPa or more and the hardness of the close portion 4a of the first deformable layer 1a is a Young's modulus of less than 100 MPa, it is possible to present a wider dynamic range of flexibility sensation to a user.

On the contrary, in the case where the hardness of the close portion 4a of the first deformable layer 1a is a Young's modulus of 100 MPa or more and the hardness of the close portion 4f of the second deformable layer 1f is a Young's modulus of less than 100 MPa, it is more easily fine-adjust the flexibility sensation although the dynamic range of a flexibility sensation to be presented to a user is slightly narrowed.

Note that the close portions 4 of the first deformable layer 1a and the second deformable layer 1f, the harder close portion 4 may be formed of a material having a Young's modulus of 400 MPa or more (e.g., polyethylene), 1 GPa or more (e.g., polystyrene), or 10 GPa or more (wood, metal, or the like). In this case, the softer close portion 4 may be correspondingly formed of a material having a Young's modulus of less than 100 MPa, less than 1 GPa, or less than 10 GPa.

Third Embodiment

Figure 8:
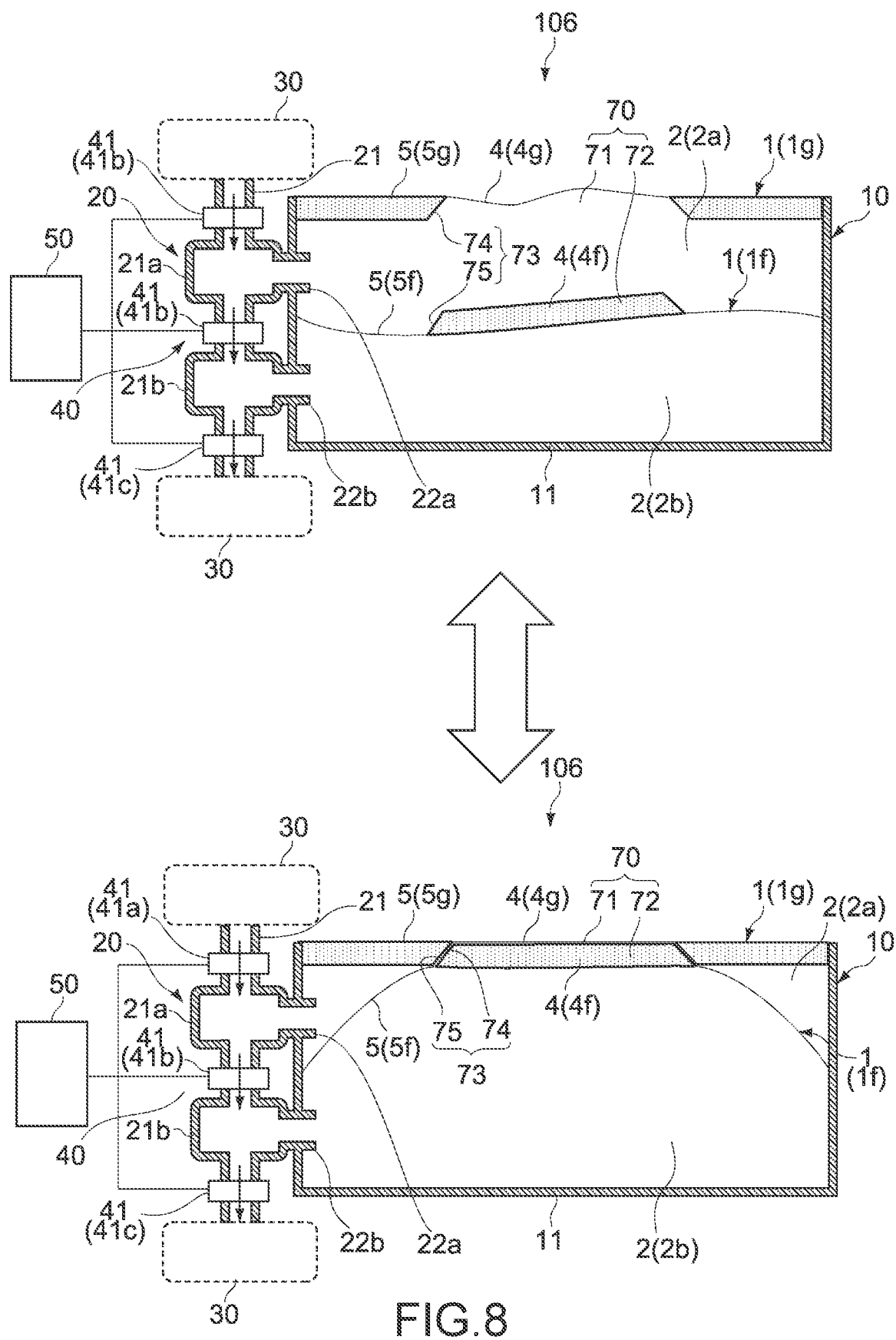
FIG. 8 is a diagram showing how a separated state and a close state are switched in a haptic presentation apparatus according to a third embodiment.

Next, a third embodiment of the present technology will be described. FIG. 8 is a diagram showing how the separated state and the close state are switched in the haptic presentation apparatus 106 according to the third embodiment. In the description of the third embodiment, the points different from those in the above-mentioned second embodiment will be mainly described.

As shown in FIG. 8, a first deformable layer 1g and the second deformable layer 1f have a fitting mechanism 70 for fitting the close portions 4 thereof to each other in the close state. This fitting mechanism 70 includes a recessed portion 71 of a close portion 4g of the first deformable layer 1g and a projecting portion 72 of the close portion 4f of the second deformable layer 1f.

In the first deformable layer 1g, the close portion 4g and the peripheral portion 5g have different thicknesses and the thickness of the peripheral portion 5g is larger than the close portion 4g. The close portion 4g of the first deformable layer 1g is connected to the front surface side (upper side) of the peripheral portion 5g of the first deformable layer 1g. As a result, the recessed portion 71 is formed at a position in the vicinity of the center (the close portion 4g) on the back surface side of the first deformable layer 1g.

The hardness of the peripheral portion 5g of the first deformable layer 1g is, for example, a Young's modulus of 100 MPa or more, and the hardness of the close portion 4g of the first deformable layer 1g is, for example, a Young's modulus of less than 100 MPa.

Also in the second deformable layer 1f, the close portion 4f and the peripheral portion 5f have different thicknesses, similarly to the first deformable layer 1g. However, contrary to the first deformable layer 1g, the thickness of the close portion 4f is larger than the thickness of the peripheral portion 5f. The peripheral portion 5f of the second deformable layer 1f is connected to the back surface side (lower side) of the close portion 4f of the second deformable layer 1f. As a result, the projecting portion 72 is formed at a position in the vicinity of the center (the close portion 4f) on the front surface side of the second deformable layer 1f.

The hardness of the close portion 4f of the second deformable layer 1f is, for example, a Young's modulus of 100 MPa or more and the hardness of the peripheral portion 5f of the second deformable layer 1f is, for example, a Young's modulus of less than 100 MPa.

Note that the close portion 4f of the second deformable layer 1f is formed to be thicker than the close portion 4g of the first deformable layer 1g and harder than the close portion 4g of the first deformable layer 1g.

The haptic presentation apparatus 106 according to the third embodiment has a latch mechanism 73 that latches the projecting portion 72 to the recessed portion 71 while the projecting portion 72 in the second deformable layer 1f fits into the recessed portion 71 of the first deformable layer 1g. This latch mechanism 73 has a first tapered surface 74 of the first deformable layer 1g and a second tapered surface 75 of the second deformable layer 1f.

The first tapered surface 74 is an inner peripheral surface in the peripheral portion 5g of the first deformable layer 1g and this first tapered surface 74 is formed to be gradually narrow toward the upper side. The second tapered surface 75 is an outer peripheral surface of the close portion 4f in the second deformable layer 1f and also this the second tapered surface 75 is formed to be gradually narrow toward the upper side.

When the separated state is switched to the close state, the projecting portion 72 of the second deformable layer 1f fits into the recessed portion 71 of the first deformable layer 1g, and the first tapered surface 74 and the second tapered surface 75 are in contact with each other. At this time, since the first tapered surface 74 in the recessed portion 71 is formed to be gradually narrow toward the upper side and the second tapered surface 75 in the projecting portion 72 is formed to be gradually narrow toward the upper side, the projecting portion 72 is latched to the recessed portion 71. As a result, for example, when the pressure in the second space 2b is increased to present a hard haptic sensation to a user, it is possible to prevent the peripheral portion 5f of the second deformable layer 1f from being excessively stretched and achieve safety.

The first tapered surface 74 and the second tapered surface 75 may each have a static friction coefficient of 0.3 or more. As a result, since the lateral displacement in the horizontal direction of the projecting portion 72 (the close portion 4f) in the second deformable layer 1f in the close state can be prevented, it is possible to present a harder haptic sensation to a user. Note that the static friction coefficient may be 0.4 or more, 0.5 or more, or 0.6 or more, and the tapered surfaces 74 and 75 may be surface-processed in order to increase the static friction coefficient.

In the description of the third embodiment, the case where the first deformable layer 1g includes the recessed portion 71 and the second deformable layer 1f includes the projecting portion 72 has been described. Meanwhile, on the contrary, the second deformable layer 1f may include the recessed portion 71 and the first deformable layer 1g may include the projecting portion 72. Further, although a tapered latch mechanism has been described as an example of the latch mechanism 73 in the description of the third embodiment, the latch mechanism 73 may have, for example, another shape such as a stepped shape.

Further, the projecting portion 72 and the recessed portion 71 typically only needs to have shapes that can be fitted to each other. For example, the recessed portion 71 may have a shape of a plurality of dot-shaped fine holes a plurality of line-shaped holes and the projecting portion 72 may have a plurality of dot-shaped or line-shaped protrusions that can be fitted into the hole shape. Further, when the projecting portion 72 fits into the recessed portion 71, the projecting portion 72 may protrude slightly above the recessed portion 71.

Fourth Embodiment

Figure 9:
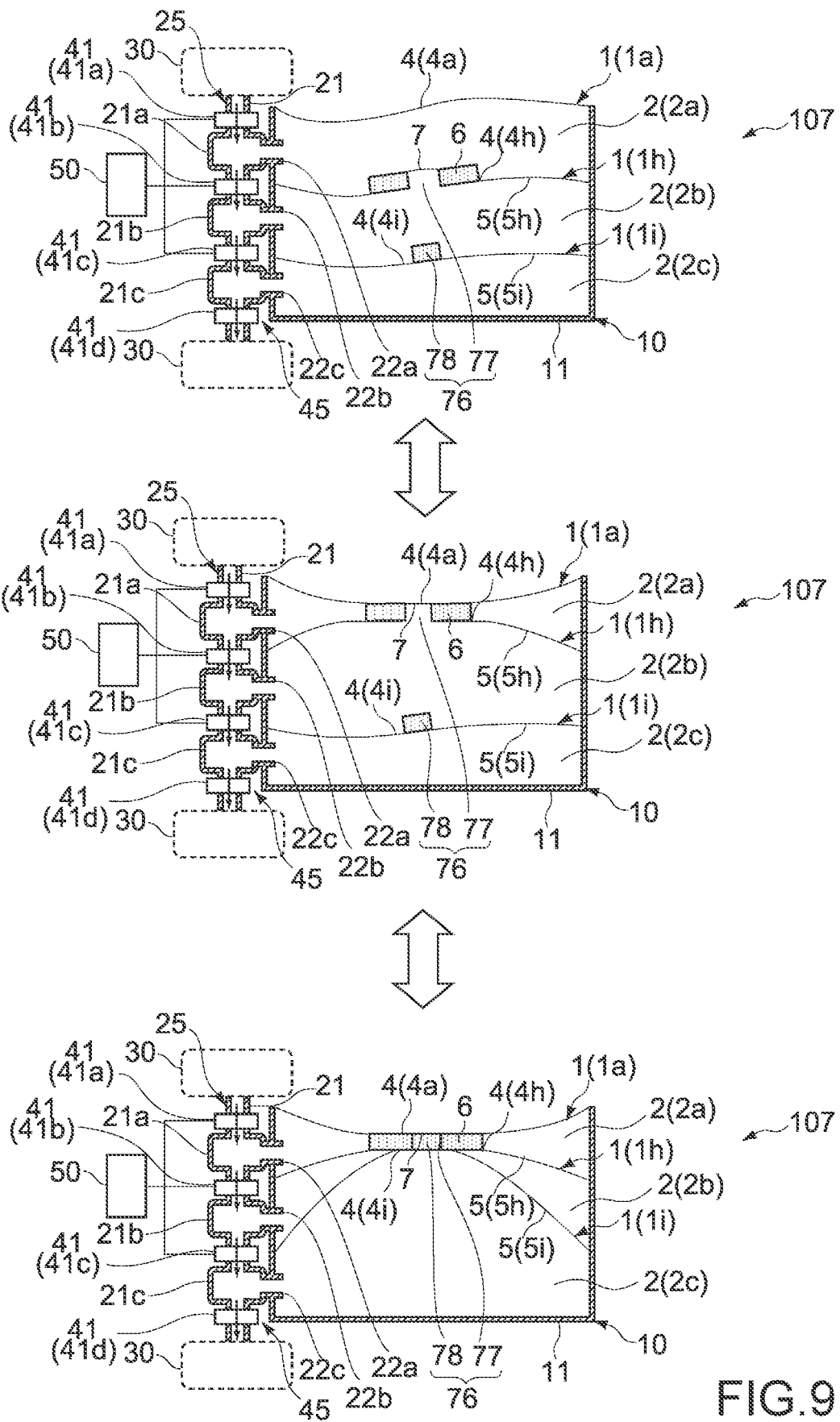
FIG. 9 is a diagram showing how a separated state and a close state are switched in a haptic presentation apparatus according to a fourth embodiment.

Next, a fourth embodiment of the present technology will be described. FIG. 9 is a diagram showing how the separated state and the close state are switched in a haptic presentation apparatus 107 according to the fourth embodiment.

The haptic presentation apparatus 107 according to the fourth embodiment includes a third deformable layer 1i in addition to the first deformable layer 1a and a second deformable layer 1h, and includes a third space 2c in addition to the first space 2a and the second space 2b. Further, a channel portion 25 includes a third connecting pipe 22c in addition to the first connecting pipe 22a and the second connecting pipe 22b, and the pipe 21 of the channel portion 25 includes a third connecting portion 21c in addition to the first connecting portion 21a and the second connecting portion 21b.

Further, a drive unit 45 includes a fourth actuator 41d in addition to the first actuator 41a, the second actuator 41b, and the third actuator 41c.

Note that although the first deformable layer 1g and the second deformable layer 1f are fitted to each other by the fitting mechanism 70 in the close state in the above-mentioned third embodiment, the second deformable layer 1h and the third deformable layer 1i are fitted to each other by a fitting mechanism 76 in this fourth embodiment.

The third deformable layer 1i is disposed at a position inward (lower layer side) of the second deformable layer 1h with a predetermined distance from the second deformable layer 1h. The third space 2c is a space surrounded by the third deformable layer 1i, the bottom portion 11 of the casing 10, and the wall portion on the lower part of the casing (a space inward of the third deformable layer 1i), and is capable of retaining fluid therein.

The third connecting pipe 22c of the channel portion 25 connects the pipe 21 and the third space 2c to each other. This third connecting pipe 22c includes an inflow/outflow port for causing fluid to flow in the third space 2c and flow out from the third space 2c. The third connecting portion 21c of the pipe 21 is formed to have a diameter larger than those of other portions in the pipe 21, and the third connecting pipe 22c is connected to this third connecting portion 21c. The fourth actuator 41d is disposed to a channel between the third connecting portion 21c and the supply source 30, and this fourth actuator 41d is located between the third space 2c and the supply source 30.

The first deformable layer 1a in the fourth embodiment has a configuration similar to that of the first deformable layer 1a in the first embodiment, and the entire first deformable layer 1a is formed of, for example, various types of rubber such as silicon rubber and natural rubber (e.g., Young's modulus of 100 MPa or less), considering elasticity.

The second deformable layer 1h and the third deformable layer 1i include the fitting mechanism 76 for fitting the close portions 4 to each other in the close state. This fitting mechanism 76 includes a recessed portion 77 of a close portion 4h of the second deformable layer 1h and a projecting portion 78 of the third deformable layer 1i.

The second deformable layer 1h is formed such that the thickness of the close portion 4h is thicker than the thickness of a peripheral portion 5h (excluding the center of the close portion 4). The peripheral portion 5h of the second deformable layer 1h is connected to the back surface side (lower side) of the close portion 4h of the second deformable layer 1h. The close portion 4h of the second deformable layer 1h includes an annular portion 6 formed in an annular portion and a central portion 7 surrounded by the annular portion 6. The central portion 7 is formed to be thinner than the annular portion 6, and this central portion 7 is connected to the upper part of the annular portion 6. As a result, the recessed portion 77 is formed at the center position on the back surface side of the close portion 4h of the second deformable layer 1h.

The hardness of the annular portion 6 is, for example, a Young's modulus of 100 MPa or more and the hardness of the central portion 7 is, for example, a Young's modulus of less than 100 MPa.

In the third deformable layer 1i, the center of a close portion 4i is formed to be thick. As a result, the projecting portion 78 is formed at the center position on the front surface side the close portion 4i of the third deformable layer 1i. In the third deformable layer 1i, the hardness of the projecting portion 78 is, for example, a Young's modulus of 100 MPa or more and the hardness of other portions in the third deformable layer 1i is, for example, a Young's modulus of less than 100 MPa.

Note that the projecting portion 72 in the close portion 4 of the third deformable layer 1i is formed to be harder than the central portion 7 (portion corresponding to the recessed portion 77) in the close portion 4h of the second deformable layer 1h.

When the pressure in the first space 2a is a negative pressure and the pressure in the second space 2b is a positive pressure, the close portion 4a of the first deformable layer 1a and the close portion 4h of the second deformable layer 1h are close to each other (center in FIG. 9). In this case, the user's sensation for flexibility changes in the close portion 4 and the user feels that the close portion 4 is partially hardened.

Further, when the pressure in the second space 2b is a negative pressure and the pressure in the third space 2c is a positive pressure, the close portion 4a of the first deformable layer 1a, the close portion 4h of the second deformable layer 1h, and the close portion 4i of the third deformable layer 1i are close to each other (lower side of FIG. 9). In this case, the user's sensation for flexibility changes in the close portion 4 and the user feels that the close portion 4 is hardened as a whole.

In addition to the fitting structure of the second deformable layer 1h and the third deformable layer 1i, a fitting structure of the first deformable layer 1a and the second deformable layer 1h may be provided. Further, the latch mechanism 73 described in the above-mentioned third embodiment may be provided.

Fifth Embodiment

Figure 10:
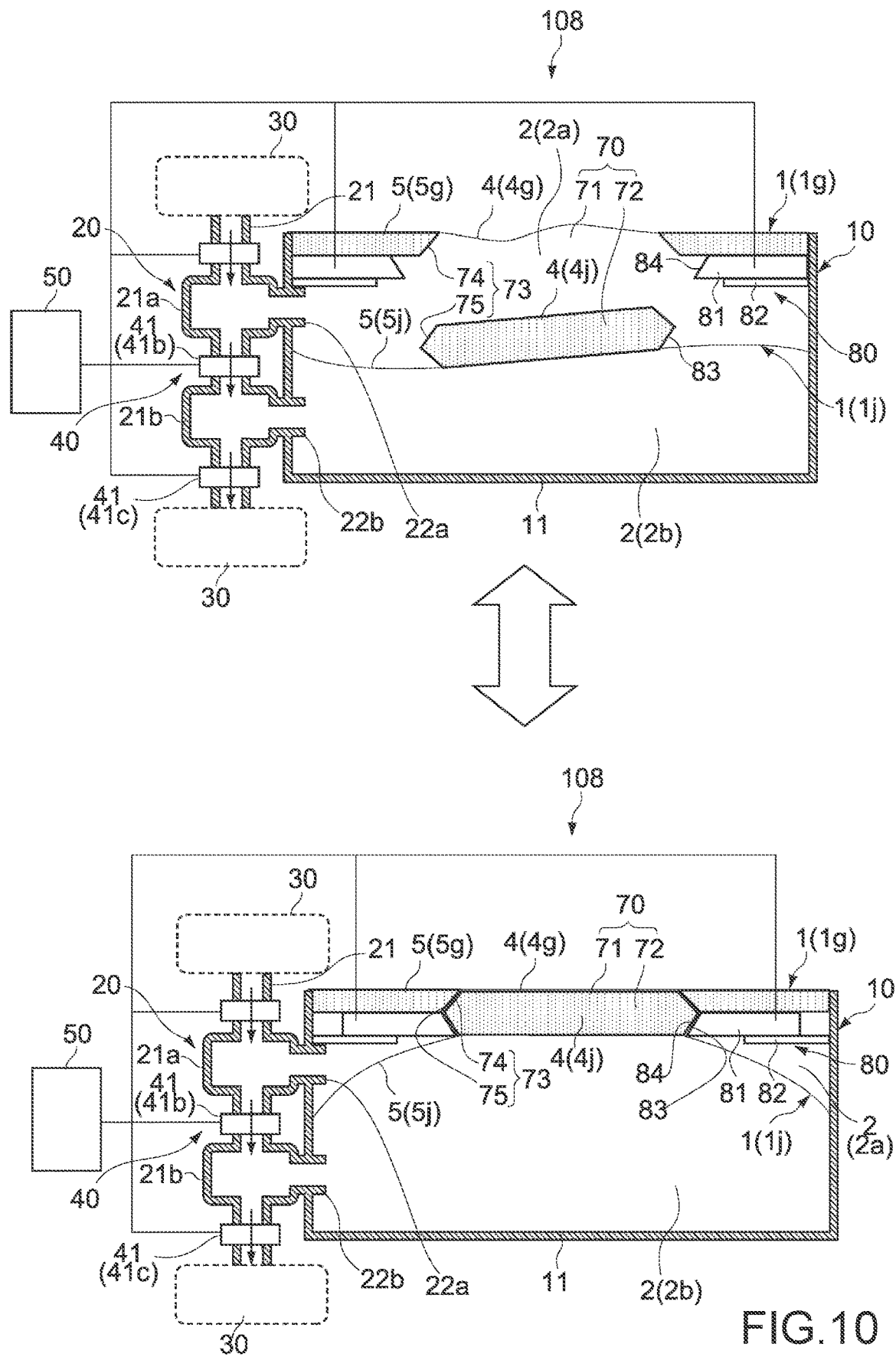
FIG. 10 is a diagram showing how a separated state and a close state are switched in a haptic presentation apparatus according to a fifth embodiment.

Next, a fifth embodiment of the present technology will be described. FIG. 10 is a diagram showing how the separated state and the close state are switched in a haptic presentation apparatus 108 according to the fifth embodiment. In the fifth embodiment, the points different from those in the above-mentioned third embodiment will be described.

The haptic presentation apparatus 108 according to the fifth embodiment is different from that in the above-mentioned third embodiment in that it includes a lock mechanism 80 in addition to the fitting mechanism 70 and the latch mechanism 73. This lock mechanism 80 locks the projecting portion 72 to the recessed portion 71 while the projecting portion 72 fits into the recessed portion 71.

In the fifth embodiment, the configuration of the first deformable layer 1g is similar to that in the third embodiment, and the first deformable layer 1g includes the first tapered surface 74 in the close portion 4g. Meanwhile, in the fifth embodiment, the lock mechanism 80 is disposed at a position below the first deformable layer 1g. This lock mechanism 80 includes a movable member 81 configured to be slidable in the horizontal direction and a guide member 82 that guides the movable member 81 to be slidable in the horizontal direction.

The movable member 81 is electrically connected to the control unit of the control device 50, and is configured to be movable between two positions (retracted position and operation position) in accordance with the control of the control unit. The guide member 82 is configured to be capable of guiding the movable member 81 while maintaining the airtightness of the first space 2a.

The movable member 81 is retracted to the retracted position such that fitting of the first deformable layer 1g to the recessed portion 71 by the projecting portion 72 of a second deformable layer 1j is not limited in the separated state (see the upper side of FIG. 10). Meanwhile, the movable member 81 is caused to move to the operation position while the projecting portion 72 of the second deformable layer 1j fits into the recessed portion 71 of the first deformable layer 1g in the close state, and locks the projecting portion 72 to the recessed portion 71 (see the lower side of FIG. 10).

In the fifth embodiment, although the configuration of a peripheral portion 5j of the second deformable layer 1j is similar to that in the above-mentioned third embodiment, the configuration of a close portion 4j of the second deformable layer 1j is different from that in the above-mentioned third embodiment. In the fifth embodiment, the outer peripheral surface on the upper part of the close portion 4j (projecting portion) of the second deformable layer 1j is the second tapered surface 75, and the outer peripheral surface on the lower part thereof is a third tapered surface 83.

The second tapered surface 75 is formed to be gradually narrow toward the upper side (the side of the first deformable layer 1a), similarly to the above-mentioned third embodiment. On the contrary, the third tapered surface 83 is formed to be gradually expand toward the upper side. The close portion 4j of the second deformable layer 1j is formed of, for example, a material having a Young's modulus of 100 MPa or more.

The movable member 81 includes a fourth tapered surface 84 corresponding to the third tapered surface 83 of the second deformable layer 1b. The fourth tapered surface 84 is one end surface on the central side of the movable member 81, and this fourth tapered surface 84 is formed to gradually expand toward the upper side. Note that the lock mechanism 80 includes the third tapered surface 83 of the second deformable layer 1j and the fourth tapered surface 84 of the movable member 81.

When the movable member 81 is caused to move to the operation position in the close state, the third tapered surface 83 of the second deformable layer 1j and the fourth tapered surface 84 of the movable member 81 are in contact with each other. As a result, the close portion 4j (projecting portion) of the second deformable layer 1j is supported from below, and the projecting portion 72 is locked to the recessed portion 71. As a result, the hardness in the close portion 4 can be maintained without maintaining the second space 2b at a high pressure.

Also the third tapered surface 83 and the fourth tapered surface 84 may each have a static friction coefficient of 0.3 or more, similarly to the first tapered surface 74 and the second tapered surface 75. As a result, the lateral displacement in the horizontal direction of the projecting portion 72 (the close portion 4) in the close state can be prevented, and it is possible to present a harder haptic sensation to a user. Note that the static friction coefficient may be 0.4 or more, 0.5 or more, or 0.6 or more, and the third tapered surface 83 and the fourth tapered surface 84 may be surface-processed in order to increase the static friction coefficient.

Although the tapered lock mechanism 80 has been described as an example of the lock mechanism 80 in the description of the third embodiment, the lock mechanism 80 may have, for example, another shape such as a stepped shape.

Note that although the case where both the latch mechanism 73 and the lock mechanism 80 are used has been described in the fifth embodiment, the lock mechanism 80 alone may be used.

Sixth Embodiment

Figure 11:
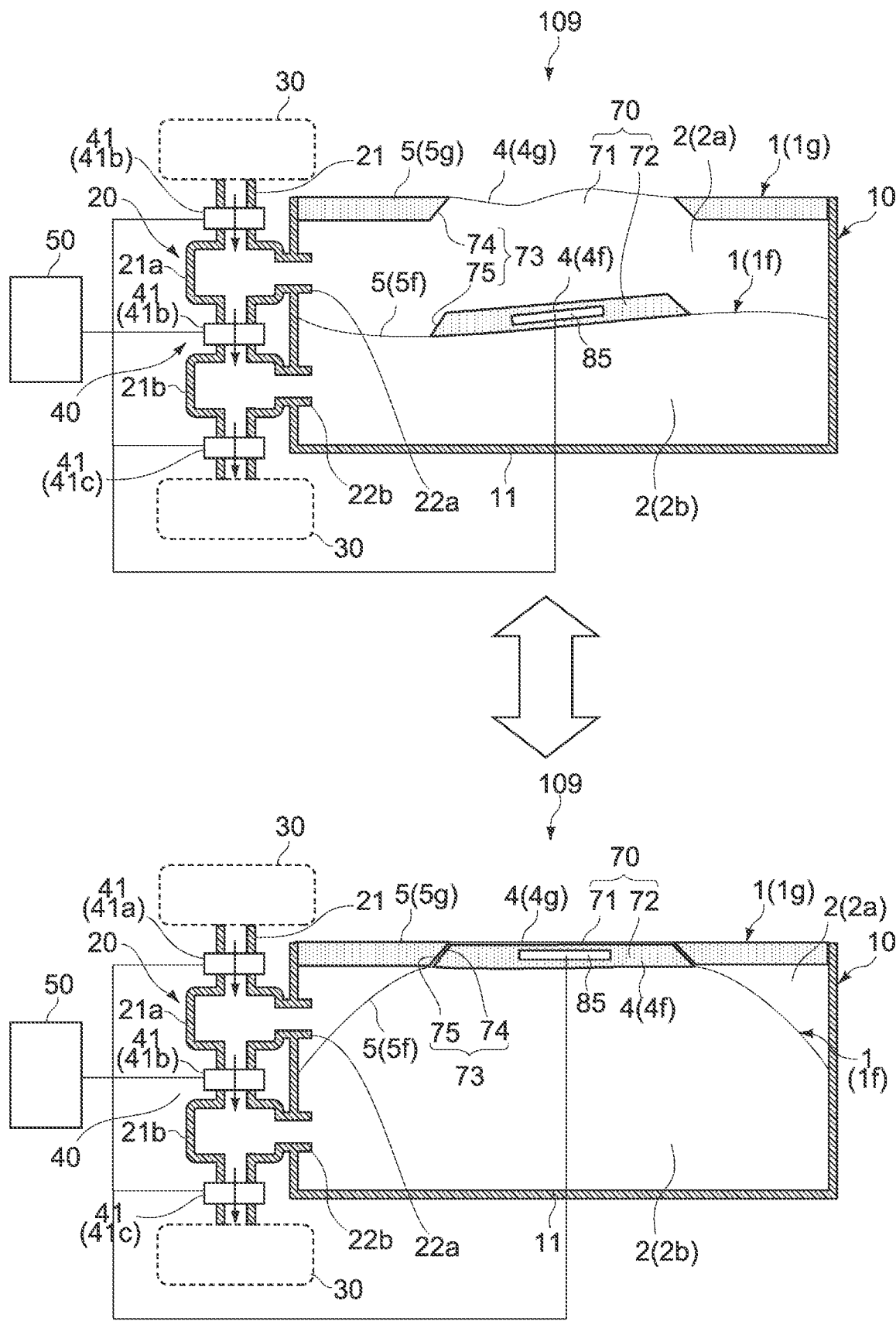
FIG. 11 is a diagram showing how a separated state and a close state are switched in a haptic presentation apparatus according to a sixth embodiment.

Next, a sixth embodiment of the present technology will be described. FIG. 11 is a diagram showing how the separated state and the close state are switched in a haptic presentation apparatus 109 according to the sixth embodiment.

The haptic presentation apparatus 109 according to the sixth embodiment has a configuration basically similar to that of the haptic presentation apparatus 106 according to the third embodiment (see FIG. 8), but the sixth embodiment is different from the third embodiment in that the second deformable layer 1f includes a temperature adjustment unit 85.

As shown in FIG. 11, in the sixth embodiment, the temperature adjustment unit 85 capable of adjusting temperature is provided inside the close portion 4f of the second deformable layer 1f. In the sixth embodiment, a Peltier device 85 will be described as an example of the temperature adjustment unit 85. Note that the temperature adjustment unit 85 is not limited to the Peltier device 85 and may include another mechanism such as a heat pipe.

The close portion 4f (the projecting portion 72) in the second deformable layer 1f is typically formed of a material having a Young's modulus of 100 MPa or more so that the temperature adjustment unit 85 (Peltier device 85) can be easily mounted.

The Peltier device 85 is electrically connected to the control unit of the control device 50, and is configured to be capable of adjusting temperature in accordance with the control of the control unit. The control unit typically drives the Peltier device 85 in the close state, but may drive the Peltier device 85 in advance in the separated state in the case where it is known in advance that the separated state is switched to the close state.

In the sixth embodiment, it is possible to present a temperature sensation to a user in addition to a flexibility sensation. As a result, for example, by presenting a cooling sensation by the Peltier device 85, it is possible to present a metal sensation to a user (even if the close portion 4 is not formed of metal). Further, for example, by presenting a warm sensation by the Peltier device 85, it is also possible to present a wood sensation to a user (even if the close portion 4 is not formed of wood).

The first deformable layer 1g (particularly, the close portion 4g) may have a thermal conductivity of 0.1 W/m·k or more. As a result, it is possible to effectively present a temperature change by the Peltier device 85 to a user. Note that the thermal conductivity of the first deformable layer 1g (particularly, the close portion 4g) may be 0.2 W/m·k or more, 0.3 W/m·k or more, 0.4 W/m·k or more, or 0.5 W/m·k or more. In order to increase the thermal conductivity of the first deformable layer 1g (particularly, the close portion 4g), for example, rubber such as silicon rubber may contain ceramics, carbon, or the like.

Note that by controlling the negative pressure of the first space 2a to increase the degree of adhesion between the close portion 4g of the first deformable layer 1g and the close portion 4f of the second deformable layer 1f, it is possible to increase the degree of adhesion between, it is possible to further effectively present a temperature change by the temperature adjustment unit 85 to a user.

In the description of the sixth embodiment, the case where the temperature adjustment unit 85 is provided to the second deformable layer 1f has been described. Meanwhile, the temperature adjustment unit 85 may be provided to the first deformable layer 1g or may be provided to both the first deformable layer 1g and the second deformable layer 1f.

Seventh Embodiment

Figure 12:
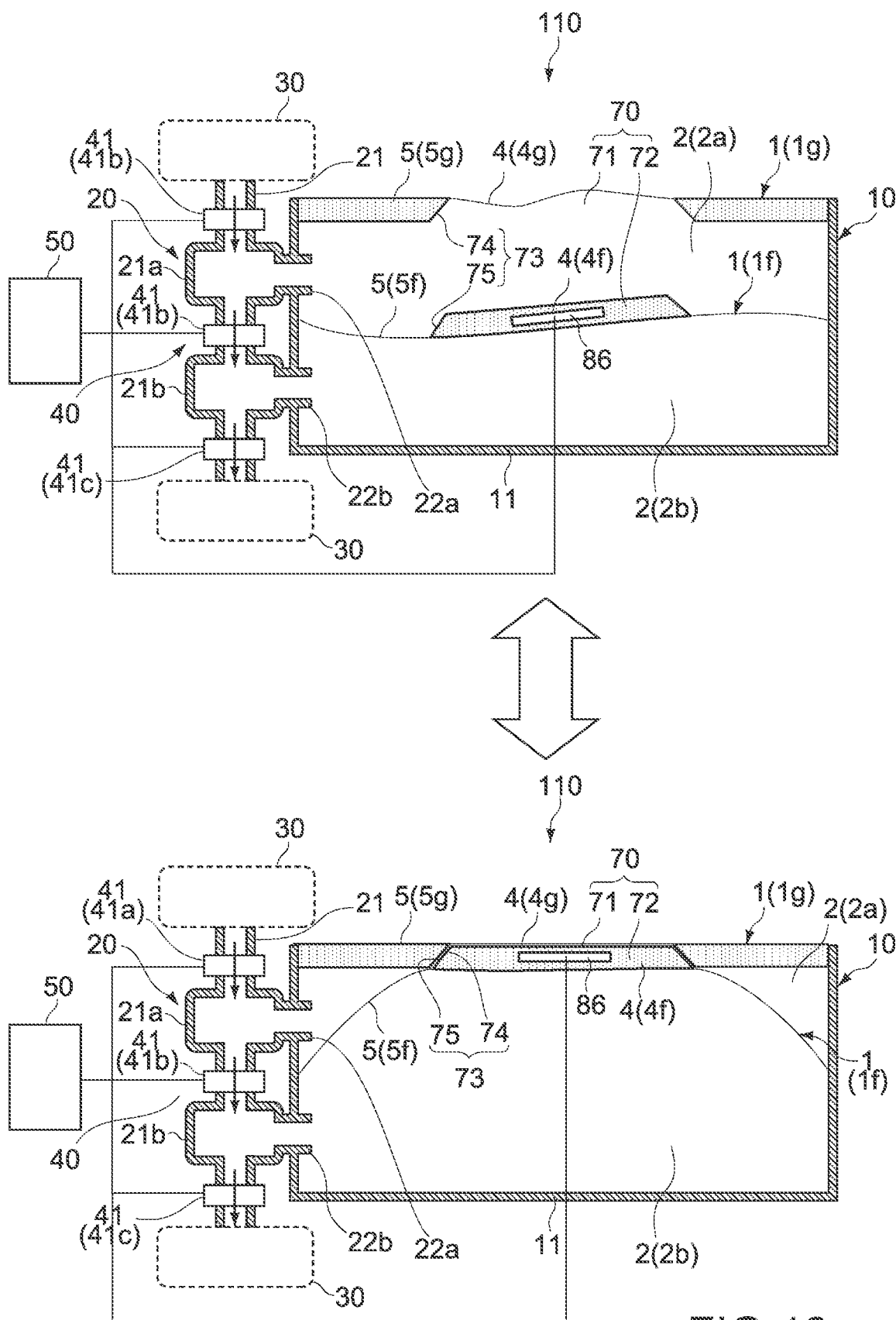
FIG. 12 is a diagram showing how a separated state and a close state are switched in a haptic presentation apparatus according to a seventh embodiment.

Next, a seventh embodiment of the present technology will be described. FIG. 12 is a diagram showing how the separated state and the close state are switched in a haptic presentation apparatus 110 according to the seventh embodiment.

The haptic presentation apparatus 110 according to the seventh embodiment has a configuration basically similar to that of the haptic presentation apparatus 108 (see FIG. 8) according to the third embodiment, and the seventh embodiment is different from the third embodiment in that the second deformable layer 1f includes a vibration unit 86.

As shown in FIG. 12, in the seventh embodiment, the vibration unit 86 is disposed inside the close portion 4f of the second deformable layer 1f. Although the vibration unit 86 is formed of, for example, an eccentric motor or a voice coil, the type of the vibration unit 86 is not particularly limited.

The close portion 4f (the projecting portion 72) in the second deformable layer 1f is typically formed of a material having a Young's modulus of 100 MPa or more so that the vibration unit 86 can be easily mounted.

The vibration unit 86 is electrically connected to the control unit of the control device 50 and is configured to be capable of vibrating in accordance with the control of the control unit. The control unit typically drives the vibration unit 86 in the close state.

In the seventh embodiment, it is possible to present vibration to a user in addition to a flexibility sensation. For example, by generating an elastic wave by vibration of the vibration unit 86, it is possible to present a hard texture of metal, wood, or the like to a user (even if the close portion 4 is not formed of metal or wood). Further, in the seventh embodiment, since the close portion 4f (the projecting portion 72) in the second deformable layer 1f is relatively hard (Young's modulus of 100 MPa or more) and this portion vibrates, the transmission efficiency of vibration of a high frequency (100 Hz to 200 Hz or the like) that is easy for a user to feel is good.

Note that by controlling the negative pressure of the first space 2a to increase the degree of adhesion between the close portion 4g of the first deformable layer 1g and the close portion 4f of the second deformable layer 1f, it is possible to further effectively present vibration by the vibration unit 86 to a user.

In the description of the seventh embodiment, the case where the vibration unit 86 is provided to the second deformable layer 1f has been described. Meanwhile, the vibration unit 86 may be provided to the first deformable layer 1g or may be provided to both the first deformable layer 1g and the second deformable layer 1f.

Eighth Embodiment

Figure 13:
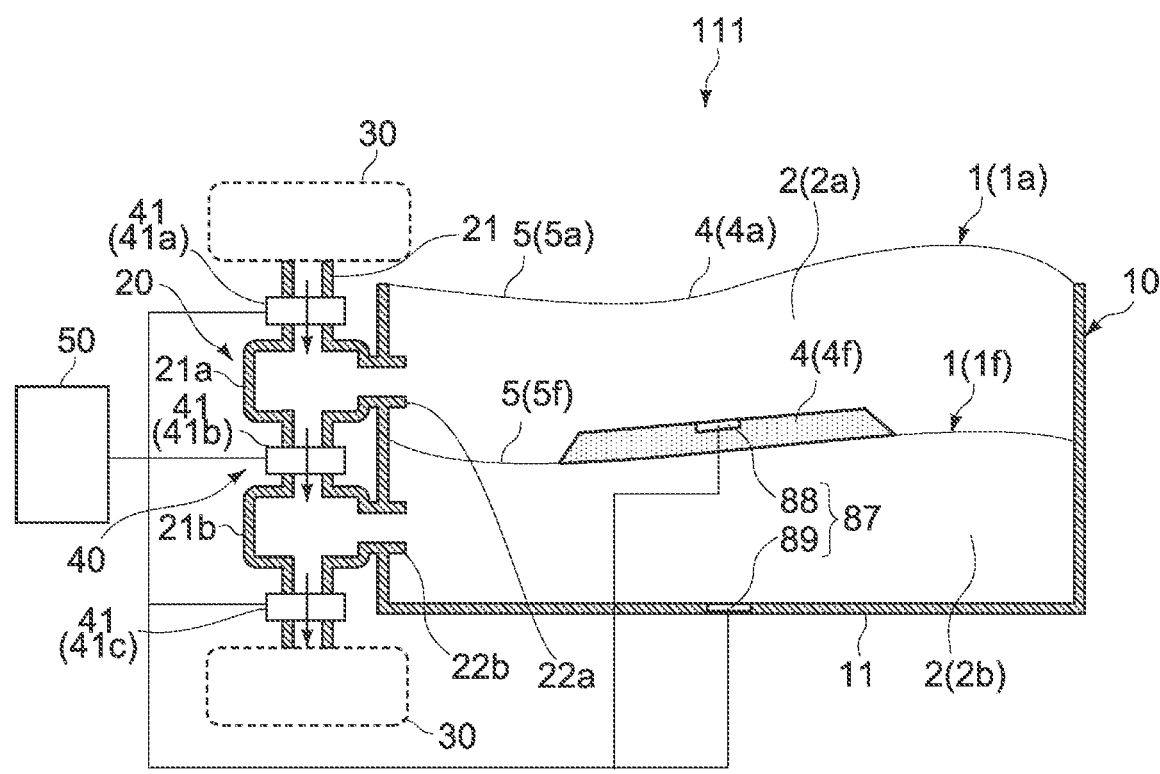
FIG. 13 is a diagram showing a haptic presentation apparatus according to an eighth embodiment.

Next, an eighth embodiment of the present technology will be described. FIG. 13 is a diagram showing a haptic presentation apparatus 111 according to the eighth embodiment. The haptic presentation apparatus 111 according to the eighth embodiment has a configuration basically similar to that of the haptic presentation apparatus 105 according to the second embodiment (see FIG. 7), but the eighth embodiment is different from the second embodiment in that the haptic presentation apparatus 111 includes the sensor unit 87.

As shown in FIG. 13, the haptic presentation apparatus 111 includes the sensor unit 87 including a first sensor 88 and a second sensor 8989. The first sensor 88 is provided in the vicinity of the center of the close portion 4f of the second deformable layer 1f. The second sensor 89 is provided in the vicinity of the center (position corresponding to the close portion 4) of the bottom portion 11 of the casing 10.

The close portion 4f in the second deformable layer 1f is typically formed of a material having a Young's modulus of 100 MPa or more so that the first sensor 88 can be easily mounted.

The first sensor 88 is configured to be capable of acquiring information (pressure, volume, or the like) regarding the first space 2a. The second sensor 89 is configured to be capable of acquiring information (pressure, volume, or the like) regarding the second space 2b.

Examples of the first sensor 88 and the second sensor 89 include, but not limited to, a piezo-type, resistance-type, or capacitance-type pressure sensor or a distance sensor using light, electromagnetic waves, sound, or the like.

For example, in the case where the first sensor 88 and the second sensor 89 are each a pressure sensor, the first sensor 88 is configured to be capable of measuring the pressure in the first space 2a and the second sensor 89 is configured to be capable of measuring the pressure in the second space 2b.

Further, for example, in the case where the first sensor 88 and the second sensor 89 are each a distance sensor, the first sensor 88 is configured to be capable of measuring the distance between the first deformable layer 1a and the second deformable layer 1f (particularly, portions corresponding to the close portions 4). Further, in this case, the second sensor 89 is configured to be capable of measuring the distance between the bottom portion 11 of the casing 10 and the second deformable layer 1f (particular, portions corresponding to the close portions 4).

The first sensor 88 and the second sensor 89 are electrically connected to the control unit of the control device 50 and transmits the acquired information to the control unit. The control unit refers to the information output from the first sensor 88 and the second sensor 89 to control outflow and inflow of fluid in the first space 2a and the second space 2b (feedback control).

For example, in the case where the first sensor 88 and the second sensor are each a pressure sensor, the control unit refers to the current pressure of the first space 2a measured by the first sensor 88 and the current pressure of the second space 2b measured by the second sensor 89 to control outflow and inflow of fluid in the first space 2a and the second space 2b.

Further, for example, in the case where the first sensor 88 and second sensor are each a distance sensor, the control unit estimates the current volume in the first space 2a on the basis of the distance between the first deformable layer 1a and the second deformable layer 1f measured by the first sensor 88. Further, in this case, the control unit estimates the current volume in the second space 2b on the basis of the distance between the bottom portion 11 of the casing 10 and the second deformable layer 1f measured by the second sensor 89. Then, the control unit refers to the estimated current volume of each of the first space 2a and the second space 2b to control outflow and inflow of fluid in the first space 2a and the second space 2b.

In the eighth embodiment, since the sensor unit 87 is provided, it is possible to improve the accuracy of outflow and inflow of fluid in the first space 2a and the second space 2b. As a result, it is possible to present a flexibility sensation to a user with high accuracy.

In the description of the eighth embodiment, the case where the first sensor 88 is provided to the second deformable layer 1f and the second sensor 89 is provided to the bottom portion 11 of the casing 10 has been described. Meanwhile, the first sensor 88 may be provided to the first deformable layer 1a and the second sensor 89 may be provided to the second deformable layer 1f.

Typically, the first sensor 88 may be provided anywhere as long as it faces the first space 2a. Similarly, the second sensor 89 may be provided anywhere as long as it faces the second space 2b.

Note that in the case where the first sensor 88 and the second sensor 89 are each a distance sensor, by providing these sensors to the first deformable layer 1a, the second deformable layer 1f, the bottom portion 11 of the casing 10 (particularly, portions corresponding to the close portions 4), the accuracy of estimating the volume of the first space 2a and the second space 2b is improved.

In the eighth embodiment, the case where the sensor unit 87 is provided to both the first space 2a and the second space 2b has been described. Meanwhile, the sensor unit 87 may be provided to only one of the first space 2a and the second space 2b. Typically, the sensor unit 87 only needs to be configured to be capable of acquiring information regarding at least one space of the first space 2a or the second space 2b. Note that, for example, in the case where the number of sensor units 87 is one in order to reduce the number of parts, this sensor unit 87 is disposed at a position capable of acquiring information regarding the first space 2a, which is most important in presenting a flexibility sensation to a user.

Ninth Embodiment

Figure 14:
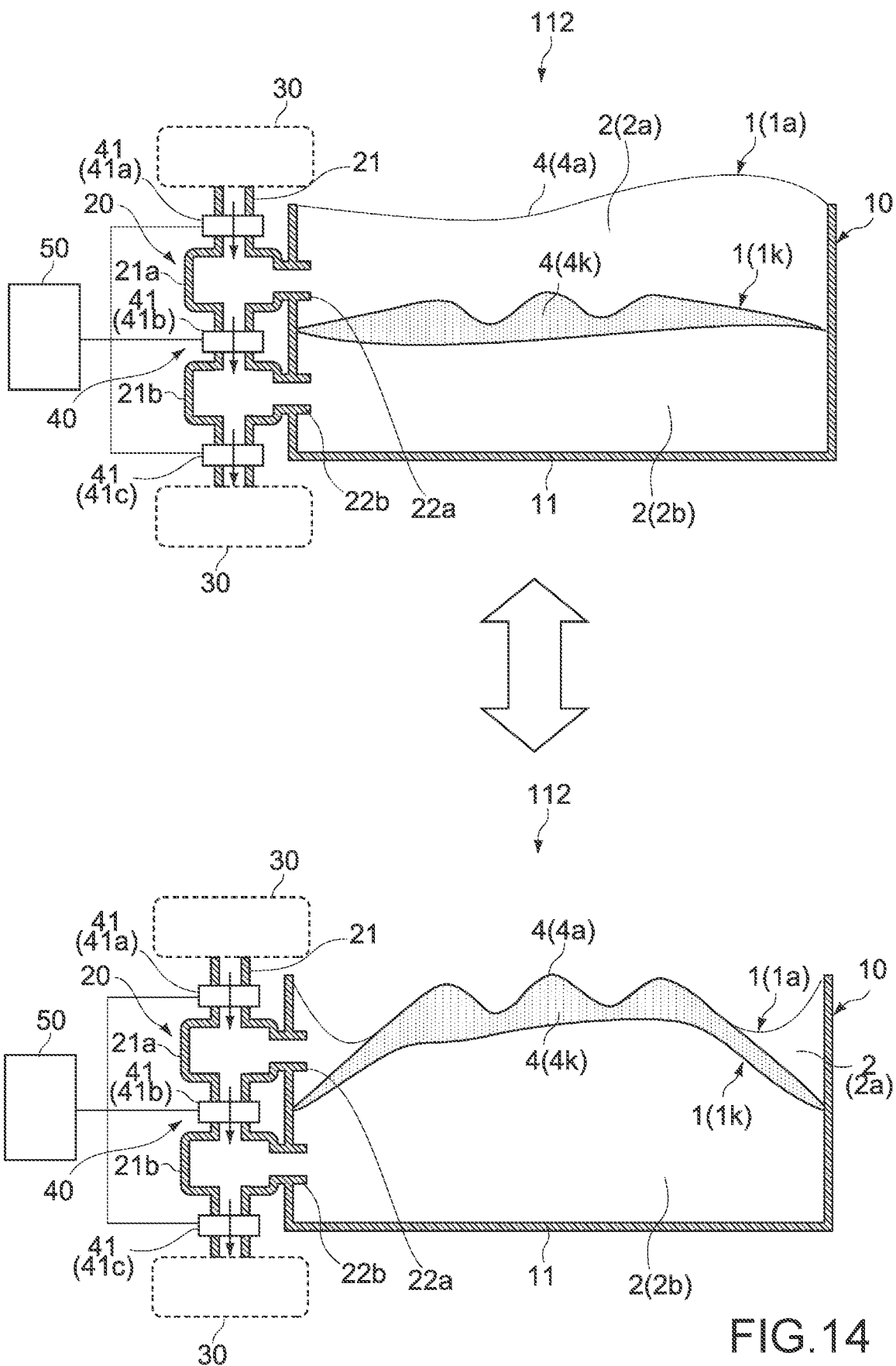
FIG. 14 is a diagram showing how a separated state and a close state are switched in a haptic presentation apparatus according to a ninth embodiment.

Next, a ninth embodiment of the present technology will be described. FIG. 14 is a diagram showing how the separated state and the close state are switched in a haptic presentation apparatus 112 according to the ninth embodiment.

Here, in each of the embodiments described above, typically, a change in flexibility sensation is presented to a user using the difference between the hardnesses of a first deformable layer and a second deformable layer (particularly, the close portions 4). Meanwhile, in the ninth embodiment, typically, a change in haptic sensation such as unevenness, flatness, smoothness, and roughness is presented to a user using the difference in the "shapes (initial shapes)" of the first deformable layer 1a and a second deformable layer 1k (particularly, the close portions 4).

Note that although a case where both the hardness and the shape (initial shape) differ in the first deformable layer 1a and the second deformable layer 1k will be described in the ninth embodiment, the hardness may be the same and only the shape may differ.

As shown in FIG. 14, in the ninth embodiment, the initial shapes of the first deformable layer 1a and the second deformable layer 1k differ. Here, the initial shape means a shape in the deformable layer 1 when no pressure difference occurs in the up-and-down direction of the deformable layer 1 in the separated state.

The first deformable layer 1a is the same as that in the first embodiment and the like, and is formed of a thin film having a constant thickness. The initial shape of this first deformable layer 1a is a flat shape. Meanwhile, the initial shape of the second deformable layer 1k is a shape including a plurality of irregularities on the front surface side thereof.

Note that although other examples of the initial shapes of the first deformable layer 1a and the second deformable layer 1k include a dot-shaped fine projecting shape or recessed shape, a line-shaped projecting shape or recessed shape, a dome-shaped projecting shape or recessed shape, and a shape that reproduces cloth, rock, or the like, typically, any shape may be used.

In the ninth embodiment, the first deformable layer 1a and the second deformable layer 1k have different initial shapes as a whole, but typically, the initial shapes only need to differ at least in the close portions 4.

In the ninth embodiment, the second deformable layer 1k is formed to be harder than the first deformable layer 1a in the close state in order to make the shape of the second deformable layer 1k more lightly to appear on the front surface of the first deformable layer 1a. In this case, for example, the hardness of the first deformable layer 1a may be a Young's modulus of less than 100 MPa and the hardness of the second deformable layer 1k may be a Young's modulus of 100 MPa or more.

Note that the first deformable layer 1a may be formed to be harder than the second deformable layer 1k. Further, although the hardnesses of the first deformable layer 1a and the second deformable layer 1k differ as a whole in the ninth embodiment, typically, the hardnesses only need to differ at least in the close portions 4. In the ninth embodiment, the hardnesses of the first deformable layer 1a and the second deformable layer 1k may be the same.

In the separated state (the upper side of FIG. 14), when a user touches the close portion 4, he/she feels a soft and flat touch sensation. Meanwhile, in the close state (the lower side of FIG. 14), when a user touches the close portion 4, he/she feels a hard and uneven touch sensation. In this way, in the ninth embodiment, it is possible to various haptic sensations such as unevenness and flatness to a user in addition to a flexibility sensation (or instead of a flexibility sensation).

Further, in the ninth embodiment, since the appearance appearing on the front surface can be changed between the separated state and the close state, it is possible to present different haptic sensations to a user while changing the appearance.

Tenth Embodiment

Figure 15:
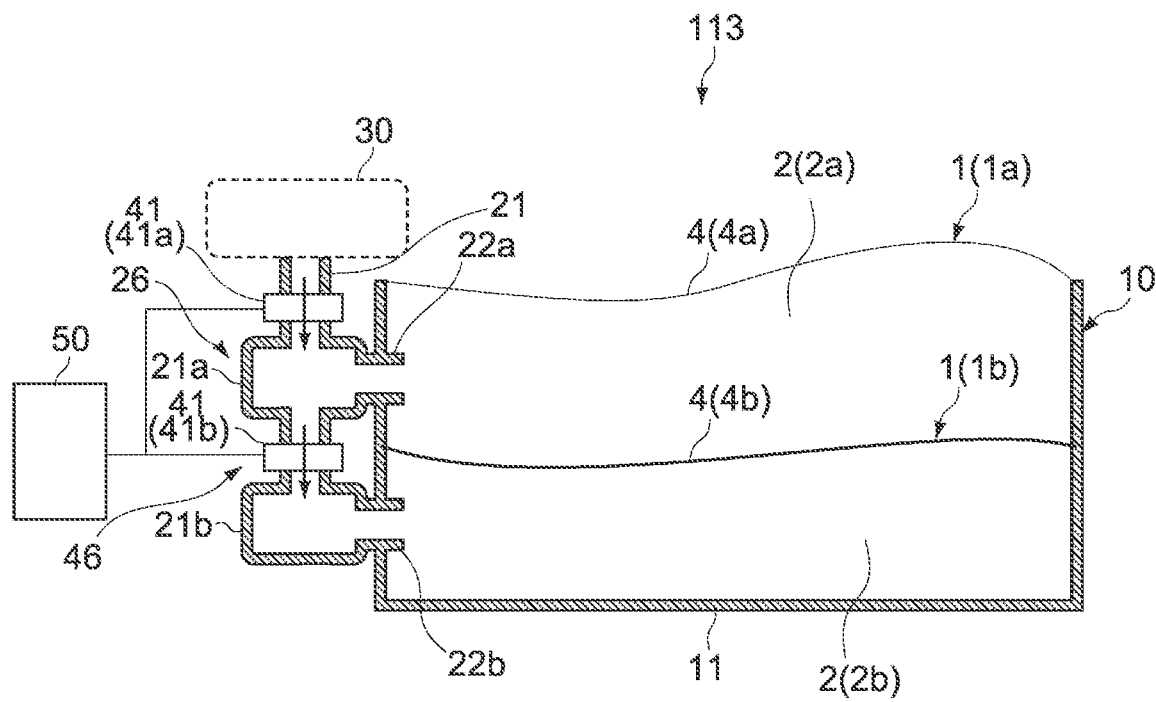
FIG. 15 is a diagram schematically showing a haptic presentation apparatus according to a tenth embodiment.
Figure 16:
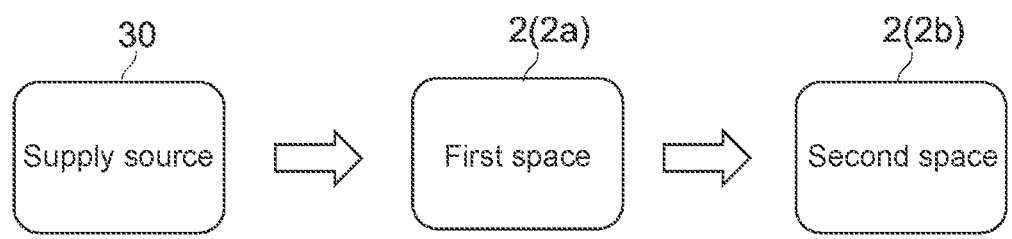
FIG. 16 is a diagram showing how fluid moves between a supply source, a first space, and a second space.
Figures 17, 18:
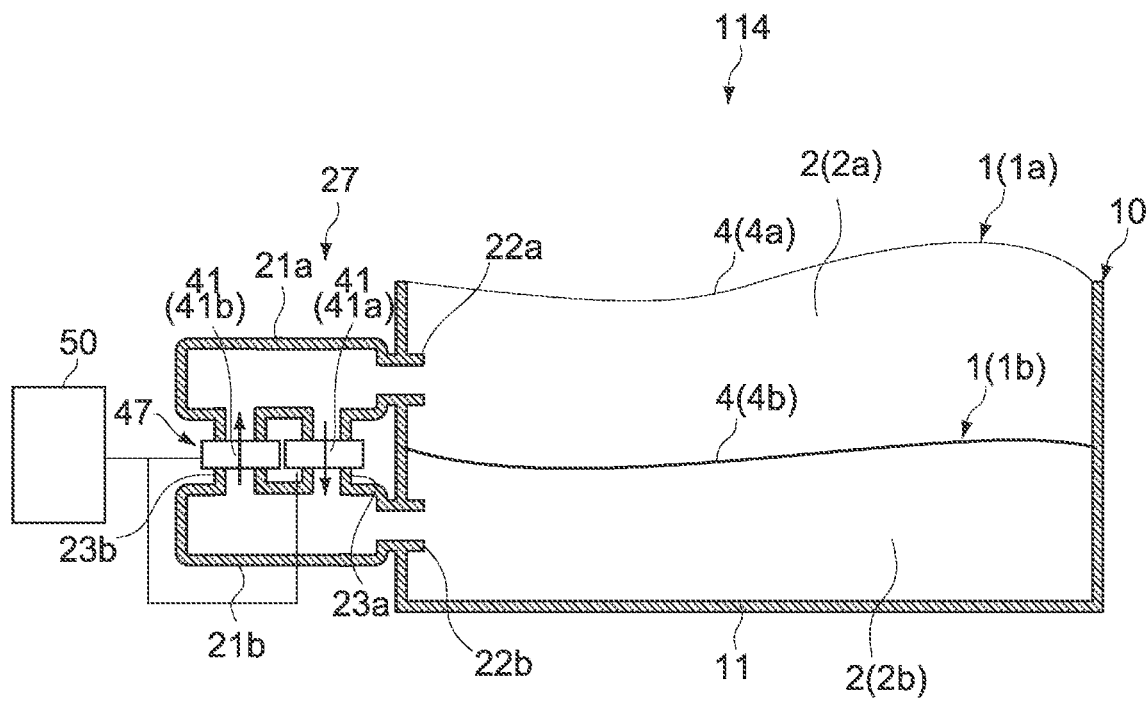
FIG. 17 is a diagram showing switching of driving of an actuator.
FIG. 18 is a diagram schematically showing a haptic presentation apparatus according to an eleventh embodiment.

Next, a tenth embodiment of the present technology will be described. FIG. 15 is a diagram schematically showing a haptic presentation apparatus 113 according to a tenth embodiment. FIG. 16 is a diagram showing how fluid moves between the supply source 30, the first space 2a, and the second space 2b. FIG. 17 is a diagram showing switching of driving of the actuator 41.

In the tenth embodiment, the configurations of a channel portion 26 and a drive unit 46 are different from those in the above-mentioned embodiments. Therefore, this point will be mainly described.

As shown in FIG. 15, in the tenth embodiment, the lower end (end opposite to the supply source 30) in the pipe 21 of the channel portion 26 is closed, and this lower end is not connected to the supply source 30, unlike the above-mentioned embodiments. Further, in the tenth embodiment, the drive unit 46 does not include the third actuator 41c, unlike the above-mentioned embodiments.

In the separated state, the control unit of the control device 50 drives the first actuator 41a and turns off the second actuator 41b. Note that the magnitude of the driving of the first actuator 41a at this time makes it possible to fine-adjust the flexibility sensation to be presented to a user.

In the close state, the control unit drives the second actuator 41b more strongly than the first actuator 41a. At this time, it is possible to fine-adjust the flexibility sensation to be presented to a user in accordance with how strongly the second actuator 41b is driven than the first actuator 41a.

In the tenth embodiment, since the necessary number of actuators 41 is only the number of spaces 2, it is possible to reduce the cost.

Eleventh Embodiment

Figures 19, 20:
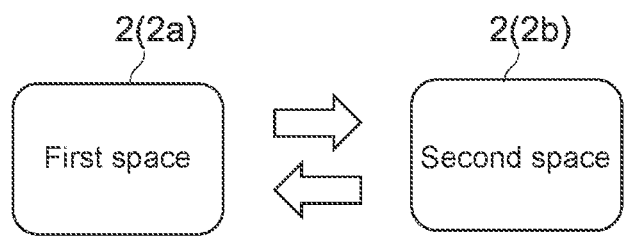
FIG. 19 is a diagram showing how fluid circulates between a first space and a second space.
FIG. 20 is a diagram showing switching of driving of an actuator.

Next, an eleventh embodiment of the present technology will be described. FIG. 18 is a diagram schematically showing a haptic presentation apparatus 114 according to the eleventh embodiment. FIG. 19 is a diagram showing how fluid circulates between the first space 2a and the second space 2b. FIG. 20 is a diagram showing switching of driving of the actuator 41.

As shown in FIG. 18, in the eleventh embodiment, both ends of a channel portion 27 in the up-and-down direction are closed and the channel portion 27 is not connected to the supply source 30, unlike the above-mentioned embodiments. That is, in the eleventh embodiment, internally-completed fluid control in which fluid moves in the first space 2a and the second space 2b is adopted.

A first pipe 23a and a second pipe 23b are connected between the first connecting portion 21a and the second connecting portion 21b of the channel portion 27. The first actuator 41a in a drive unit 47 is disposed in the channel of the first pipe 23a and the second actuator 41b in the drive unit is disposed in the channel of the second pipe 23b. The first actuator 41a is disposed between the first space 2a and the second space 2b, and generates a pressure gradient from the side of the first space 2a toward the side of the second space 2b. The second actuator 41b is disposed between the first space 2a and the second space 2b, and generates a pressure gradient from the side of the second space 2b toward the side of the first space 2a.

In the separated state, the control unit of the control device 50 drives the second actuator 41b and turns off the first actuator 41a. Note that the magnitude of the driving of the second actuator 41b at this time makes it possible to fine-adjust the flexibility sensation to be presented to a user.

In the close state, the control unit of the control device 50 drives the first actuator 41a and turns off the second actuator 41b. Note that the magnitude of the driving of the first actuator 41a at this time makes it possible to fine-adjust the flexibility sensation to be presented to a user.

In the eleventh embodiment, since the necessary number of actuator 41 is only the number of spaces 2, it is possible to reduce the cost. Further, since internally-completed fluid control is adopted in the eleventh embodiment, it is possible to prevent foreign matters such as dust from entering the first space 2a and the second space 2b from the outside.

Twelfth Embodiment

Figure 21:
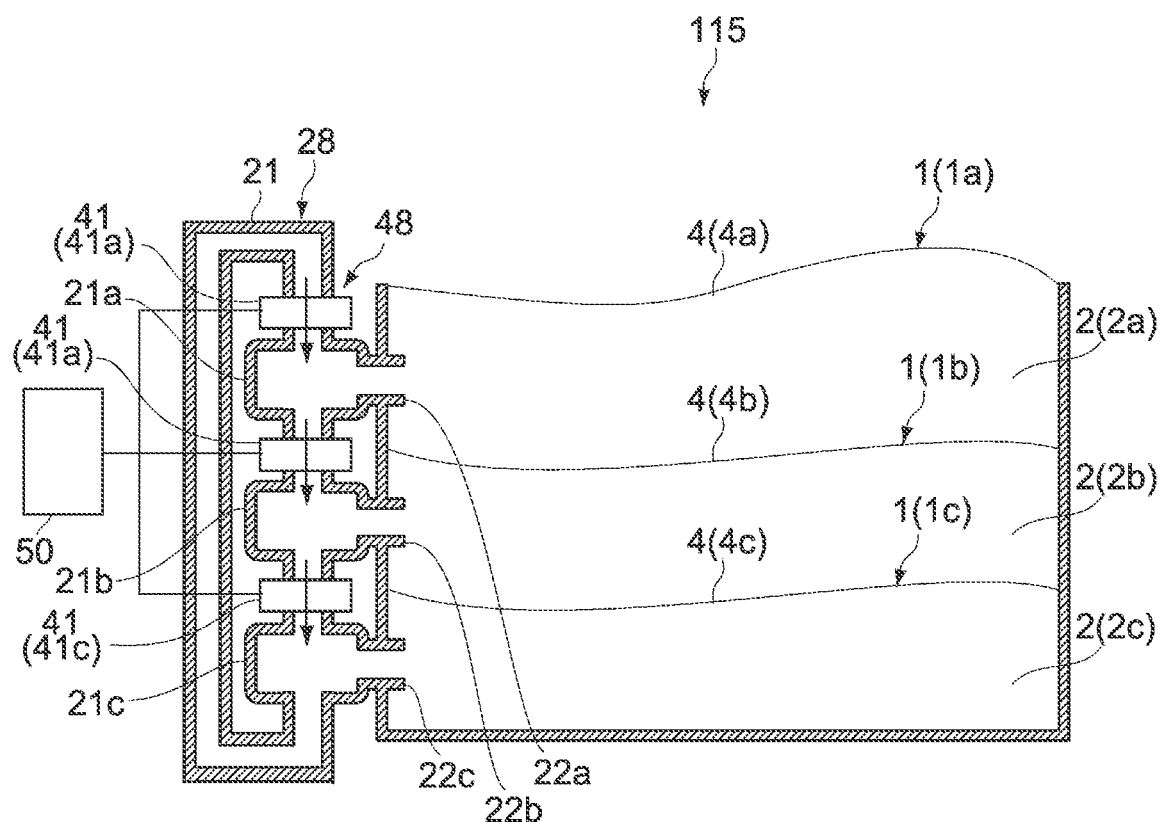
FIG. 21 is a diagram schematically showing a haptic presentation apparatus according to a twelfth embodiment.
Figure 22:
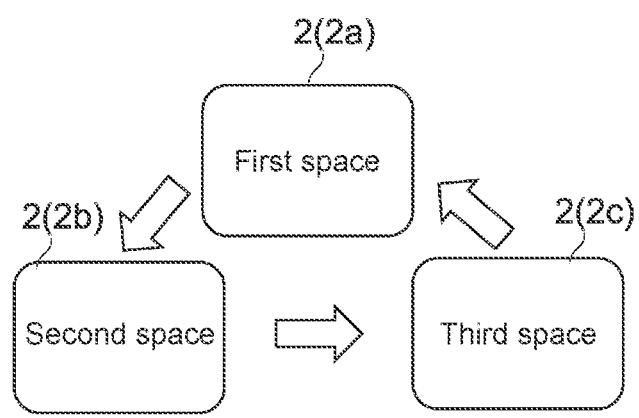
FIG. 22 is a diagram showing how fluid circulates between a first space, a second space, and a third space.
Figures 23, 24:
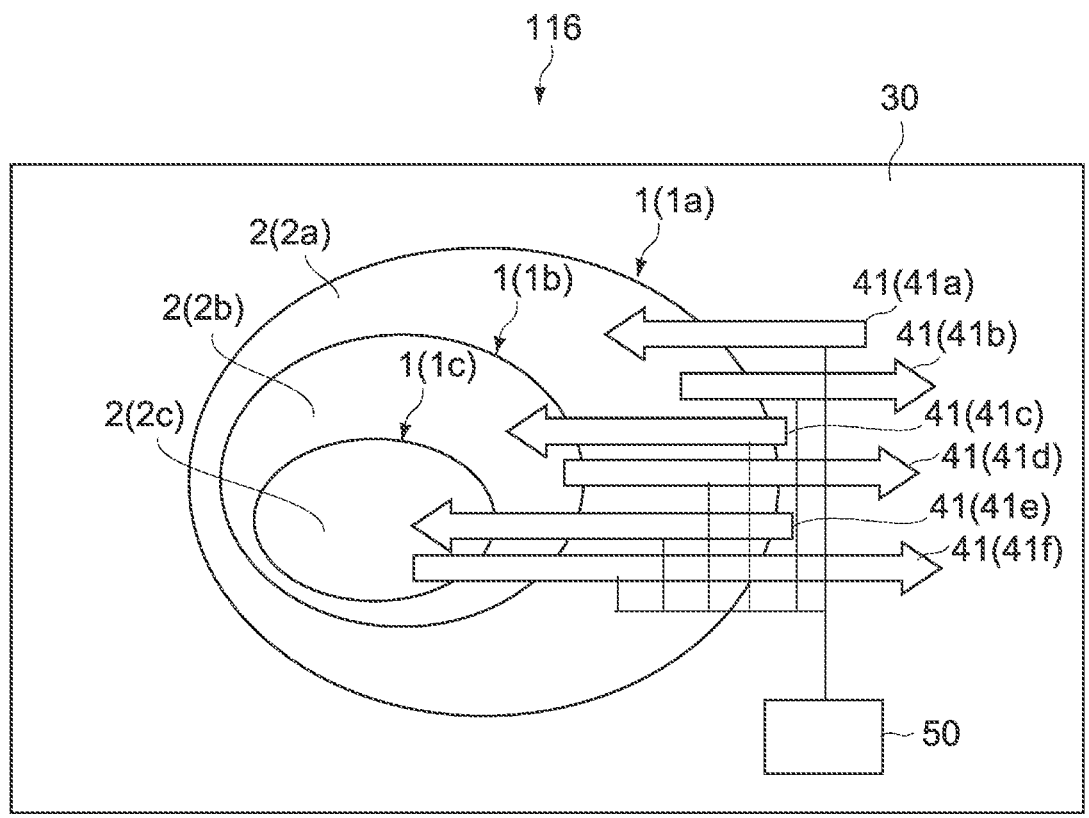
FIG. 23 is a diagram showing switching of driving of an actuator.
FIG. 24 is a schematic diagram showing a haptic presentation apparatus according to a thirteenth embodiment.

Next, a twelfth embodiment of the present technology will be described. FIG. 21 is a diagram schematically showing a haptic presentation apparatus 115 according to the twelfth embodiment. FIG. 22 is a diagram showing how fluid circulates between the first space 2a, the second space 2b, and the third space 2c. FIG. 23 is a diagram showing switching of driving of the actuator 41.

The haptic presentation apparatus 100 according to the twelfth embodiment employing internally-completed fluid control in the case where the deformable layer 1 includes three layers and the space 2 includes three spaces will be described as an example.

As shown in FIG. 21, in the twelfth embodiment, both ends of the pipe 21 of a channel portion 28 in the up-and-down direction are connected and the channel portion 28 is not connected to the supply source 30.

The first actuator 41a of a drive unit 48 is disposed between the third space 2c and the first space 2a, and generates a pressure gradient from the side of the third space 2c toward the side of the first space 2a. The second actuator 41b is disposed between the first space 2a and the second space 2b, and generates a pressure gradient from the side of the first space 2a toward the second space 2b. The third actuator 41c is disposed between the second space 2b and the third space 2c, and generates a pressure gradient from the side of the second space 2b toward the third space 2c.

In the twelfth embodiment, as shown in FIG. 22, fluid control of a circulation type in which fluid circulates in the order of the first space 2a->the second space 2b->the third space 2c->the first space 2a-> . . . is adopted. Meanwhile, on the contrary, fluid control of a circulation type in which fluid circulates in the order of the first space 2a->the third space 2c->the second space 2b->the first space 2a-> . . . may be adopted. In this case, the first actuator 41a, the second actuator 41b, and the third actuator 41c are disposed in the orientation opposite to the orientation shown in FIG. 21.

In the separated state, the control unit of the control device 50 moderately drives the first actuator 41a, turns off the second actuator 41b, and weakly drives the third actuator 41c. Note that the magnitude of the driving of the first actuator 41a at this time makes it possible to fine-adjust the flexibility sensation to be presented to a user.

In the close state in which the two layers of the first deformable layer 1a and the second deformable layer 1b are close to each other, the control unit of the control device 50 weakly drives the first actuator 41a, moderately drives the second actuator 41b, and turns off the third actuator 41c. Note that the magnitude of the driving of the second actuator 41b at this time makes it possible to fine-adjust the flexibility sensation to be presented to a user.

In the close state in which the three layers of the first deformable layer 1a, the second deformable layer 1b, and a third deformable layer 1c are close to each other, the control unit of the control device 50 turns off the first actuator 41a, weakly drives the second actuator 41b, and moderately drives the third actuator 41c. Note that the magnitude of the driving of the third actuator 41c at this time makes it possible to fine-adjust the flexibility sensation to be presented to a user.

In the twelfth embodiment, the necessary number of actuators 41 is only the number of spaces 2, similarly to the eleventh embodiment, it is possible to reduce the cost. Further, in the twelfth embodiment, since internally-completed fluid control is adopted similarly to the eleventh embodiment, it is possible to prevent foreign matters such as dust from entering the first space 2a, the second space 2b, and the third space 2c.

Thirteenth Embodiment

Next, a thirteenth embodiment of the present technology will be described. FIG. 24 is a schematic diagram showing a haptic presentation apparatus 116 according to the thirteenth embodiment. FIG. 25 is a diagram showing switching of driving of the actuator 41.

As shown in FIG. 24, the haptic presentation apparatus 116 includes three deformable layers 1 of the first deformable layer 1a, the second deformable layer 1b, and the third deformable layer 1c. Further, the haptic presentation apparatus 116 includes three spaces 2 of the first space 2a, the second space 2b, and the third space 2c.

The first actuator 41a and the second actuator 41b are disposed between the supply source 30 (the atmosphere in the example shown in FIG. 24) and the first space 2a. The third actuator 41c and the fourth actuator 41d are disposed between the supply source 30 and the second space 2b. Further, a fifth actuator 41ee and a sixth actuator 41f are disposed between the supply source 30 and the third space 2c.

The first actuator 41a generates a pressure gradient from the side of the supply source 30 toward the side of the first space 2a. On the contrary, the second actuator 41b generates a pressure gradient from the side of the first space 2a toward the side of the supply source 30. The third actuator 41c generates a pressure gradient from the side of the supply source 30 toward the side of the second space 2b. On the contrary, the fourth actuator 41d generates a pressure gradient from the side of the second space 2b toward the side of the supply source 30. Further, the fifth the actuator 41e generates a pressure gradient from the side of the supply source 30 toward the side of the third space 2c. On the contrary, the sixth actuator 41f generates a pressure gradient from the side of the third space 2c toward the side of the supply source 30.

The control unit of the control device 50 strongly drives the first actuator 41a and turns off the second actuator 41b when switching the close state in which the first deformable layer 1a, the second deformable layer 1b, and the third deformable layer 1c are close to each other to the separated state. Further, the control unit turns off the third actuator 41c and strongly drives the fourth actuator 41d. Further, at this time, the control unit turns off the fifth the actuator 41e and strongly drives the sixth actuator 41f.

When the close state is switched to the separated state and then this separated state is maintained, the control unit drives the first actuator 41a with a strength equal to or more than the second actuator 41b. Further, the control unit weakly drives or turns off the fourth actuator 41d that has been strongly driven while maintaining the third actuator 41c off. Further, at this time, the control unit weakly drives or turns off the sixth actuator 41f that has been strongly driven while maintaining the fifth the actuator 41e off.

Note that when the separated state is maintained, it is possible to fine-adjust the flexibility sensation to be presented to a user in accordance with how strongly the first actuator 41a is driven than the second actuator 41b.

The control unit turns off the first actuator 41a and strongly drives the second actuator 41b when the separated state is switched to the close state in which the two layers of the first deformable layer 1a and the second deformable layer 1b are close to each other. Further, the control unit strongly drives the third actuator 41c and turns off the fourth actuator 41d. Further, at this time, the control unit turns off the fifth the actuator 41e and strongly drives the sixth actuator 41f.

When the separated state is switched to the close state in which the two layers of the first deformable layer 1a and the second deformable layer 1b are close to each other and then this close state is maintained, the control unit weakly drives or turns off the second actuator 41b that has been strongly driven while maintaining the first actuator 41a off. Further, the control unit drives the third actuator 41c with a strength equal to or more than the fourth actuator 41d. Further, at this time, the control unit weakly drives or turns off the sixth actuator 41f that has been strongly driven while maintaining the fifth the actuator 41e off.

Note that when the close state of the two layers of the first deformable layer 1a and the second deformable layer 1b is maintained, the control unit is capable of fine-adjusting the flexibility sensation to be presented to a user in accordance with how strongly the third actuator 41c is driven than the fourth actuator 41d.

When the close state in which the two layers of the first deformable layer 1a and the second deformable layer 1b are close to each other (separated state in which the second deformable layer 1b and the third deformable layer 1c are separated from each other) is switched to the close state in which the three layers of the first deformable layer 1a, the second deformable layer 1b, and the third deformable layer 1c are close to each other, the control unit turns off the first actuator 41a and strongly drives the second actuator 41b.

Further, at this time, the control unit turns off the third actuator 41c and strongly drives the fourth actuator 41d. Further, the control unit strongly drives the fifth the actuator 41e and turns off the sixth actuator 41f.

When the close state of two layers is switched to the close state of three layers and then this close state is maintained, the control unit weakly drives or turns off the second actuator 41b that has been strongly driven while maintaining the first actuator 41a off. Further, the control unit weakly drives or turns off the fourth actuator 41d that has been strongly driven while maintaining the third actuator 41c off. Further, the control unit drives the fifth the actuator 41e with a strength equal to or more than the sixth actuator 41f.

Note that when the close state of the three layers of the first deformable layer 1a, the second deformable layer 1b, and the third deformable layer 1c is maintained, the control unit is capable of fine-adjusting the flexibility sensation to be presented to a user in accordance with how strongly the fifth the actuator 41e is driven than the sixth actuator 41f.

Fourteenth Embodiment

Next, a fourteenth embodiment of the present technology will be described. FIG. 26 is a schematic diagram showing a haptic presentation apparatus 117 according to the fourteenth embodiment.

Although the supply source 30 is common in the first space 2a, the second space 2b, and the third space 2c in the above-mentioned thirteenth embodiment, the supply source 30 is separately provided corresponding to the respective spaces 2 in this fourteenth embodiment.

As shown in FIG. 26, the haptic presentation apparatus 117 includes a first supply source 30a capable of supplying fluid to the first space 2a, a second supply source 30b capable of supplying fluid to the second space 2b, and a third supply source 30c capable of supplying fluid to the third space 2c.

The first actuator 41a and the second actuator 41b control outflow and inflow of fluid between the first supply source 30a and the first space 2a. The third actuator 41c and the fourth actuator 41d control outflow and inflow of fluid between the second supply source 30b and the second space 2b. The fourth actuator 41d and the fifth the actuator 41e control outflow and inflow of fluid between the third supply source 30c and the third space 2c.

The fluids in the first supply source 30a, the second supply source 30b, and the third supply source 30c have different properties, and the fluids having different properties flow in and out of the first space 2a, the second space 2b, and the third space 2c. Note that at least one fluid in the supply sources 30 (the spaces 2) only needs to have a property different from those of the fluids in the other supply sources (the spaces 2).

Examples of different properties of fluid include different temperatures of fluid and different types of fluid. As an example of different types of fluid, the type of a gas differs (e.g., air and helium) although the gas is used as fluid, or the type of a liquid differs (e.g., water and oil) although the liquid is used as fluid. Further, as still another example, a gas and a liquid (air and water, water and water vapor, etc.) are used as fluids. Further, as an example of different types of fluid, the fluid contains different component (e.g., the content of helium differs in the mixed gas of air and helium). Note that different types of fluid have different fluid densities.

For example, in the case where different temperatures of fluid is used, it is possible to present a different temperature sensation to a user in accordance with switching of the separated state and the close state. Further, in the case where different types of fluid is used, it is possible to present different sensations of mass, thermal conduction, response, and the like to a user in accordance with switching of the separated state and the close state.

Application Example

The haptic presentation apparatus according to the present technology can be used for various purposes. For example, by using the haptic presentation apparatus for a VR (Virtual Reality) or AR (Augmented Reality) apparatus, it is possible to present, to a user, a haptic sensation as if he/she actually touched a virtual object. Further, by using the haptic presentation apparatus for a display, it is possible to present various haptic sensations to a user when the user touched the display. In particular, in the case where the haptic presentation apparatus according to the present technology (particularly, an embodiment of the deformable layer 1 having a different shape: see FIG. 14) is used for a display, it is possible to present a haptic sensation of an object to a user while three-dimensionally displaying the object (tangible display).

The haptic presentation apparatus according to the present technology can be used for any purpose such as a wearable apparatus, an input apparatus, a medical apparatus, a simulation apparatus, and an entertainment apparatus as long as it is typically used for presenting a haptic sensation to a user.

Note that the present technology can be used for purposes other than presenting a haptic sensation to a user. In this case, the present technology is used as fluid control apparatus (the wording of the haptic presentation apparatus in each embodiment can be read as a fluid control apparatus). This fluid control apparatus includes a haptic presentation apparatus. Further, the fluid control apparatus can be used as a display apparatus capable of changing the shape for each target display object (whether or not a user can touch it can be ignored), a robot hand capable of changing the hardness and shape of a grip portion for each object to be gripped, or the like. Typically, the fluid control apparatus can be used for any purpose as long as it is intended to change at least one of the hardness or shape of a surface.

Various Modified Examples

The embodiments described above can be combined with each other as appropriate. For example, two or more of the fitting mechanism 70 (FIG. 9, etc.), the latch mechanism 73 (FIG. 8, etc.), the lock mechanism 80 (FIG. 10), the temperature adjustment unit 85 (FIG. 11), the vibration unit 86 (FIG. 12), and the sensor unit 87 (FIG. 13) may be combined.

Modified Example 1

FIG. 27 is a diagram showing a haptic presentation apparatus 118 according to a first modified example of the present technology. In this haptic presentation apparatus 118, the control in the control device 50 is different from those in the embodiments described above.

This haptic presentation apparatus 118 has a two-layer structure including the first deformable layer 1a, the second deformable layer 1b, the first space 2a, and the second space 2b. Note that the haptic presentation apparatus 118 may have a structure of three or more layers.

As shown in the upper side of FIG. 27, the control device 50 simultaneously makes the first space 2a and the second space 2b a positive pressure and causes fluid to simultaneously flow in the first space 2a and the second space 2b. As a result, it is possible to quickly expand the front surface of the first deformable layer 1a and present a haptic sensation of being strongly pressed to a user.

Further, as shown in the lower side of FIG. 27, the control device 50 simultaneously makes the first space 2a and the second space 2b a negative pressure and causes fluid to flow out from the first space 2a and the second space 2b. As a result, it is possible to quickly contract the front surface of the first deformable layer 1a and present a haptic sensation of being strongly drawn to a user.

Modified Example 2

Next, a second modified example of the present technology will be described. FIG. 28 is a diagram showing a haptic presentation apparatus 119 according to the second modified example.

In the second modified example, a case where a haptic sensation is presented by the haptic presentation apparatus 119 in accordance with video displayed by a head-mounted display 60 capable of performing VR display, AR display, and the like will be described.

The haptic presentation apparatus 119 has a two-layer structure of the first deformable layer 1a, the second deformable layer 1b, the first space 2a, and the second space 2b. Note that the haptic presentation apparatus 119 may have a structure of three or more layers. Typically, the haptic presentation apparatus 119 corresponds to one of the haptic presentation apparatuses 100 and 105 to 118 described in the above-mentioned embodiments and modified examples.

With reference to the left side of FIG. 28, in this figure, video of a marshmallow is displayed by the head-mounted display 60 and how a soft touch sensation is provided by the haptic presentation apparatus 119 to a user in accordance with this video is shown.

In this case, for example, the first space 2a is made a positive pressure and the second space 2b is made a negative pressure (in the separated state), whereby it is possible to present, to a user, a soft touch sensation as if he/she touched a marshmallow.

In this example, a marshmallow has been described as an example of a soft object, but this may be a cushion, a stuffed animal, or the like and can be changed as appropriate.

With reference to the center of FIG. 28, in this figure, video of a hamster is displayed by the head-mounted display 60 and how a soft touch sensation and minute movement due to the heartbeat, breathing, or the like are presented by the haptic presentation apparatus 119 to a user in accordance with this video is shown.

In this case, for example, the first space 2a is made a positive pressure and the second space 2b is made a negative pressure (in the separated state), whereby it is possible to present, to a user, a soft touch sensation as if he/she touched the hamster. Further, by increasing or decreasing the pressure in accordance with the time in the first space $2a$, it is possible to present, to a user, a touch sensation like minute movement due to the heartbeat, breathing, or the like of the hamster.

In this example, a hamster has been described as an example of a soft animal, but this may be a cat, a dog, or the like and can be changed as appropriate. Further, in this example, the heartbeat or breathing of an animal has been described as an example of the case where a front surface moves, but this is applicable to anything as long as the front surface thereof moves.

With reference to the right side of FIG. 28, in this figure, video of a stone is displayed by the head-mounted display 60 and how a hard touch sensation is presented by the haptic presentation apparatus 119 to a user in accordance with this movie is shown.

In this case, for example, the first space $2a$ is made a negative pressure and the second space $2b$ is made a negative pressure, whereby it is possible to present, to a user, a hard touch sensation as if he/she touched the stone (because the finger touches the bottom portion 11 of the casing 10).

In this example, a stone has been described as an example of a hard object, but this may be metal, wood, or the like and can be changed as appropriate.

Further, in the example shown in FIG. 28, the cases where the touch sensation is soft and hard have been described. Meanwhile, the haptic presentation apparatus 119 is capable of presenting, to a user, also sensations of relatively-soft, slightly-hard and relatively-soft, slightly-soft and relatively-hard, relatively-hard, and the like together with video of an object of these sensations (because the dynamic range of the flexibility sensation is wide as described above).

For example, in the case of presenting a relatively-soft haptic sensation to a user, the first space $2a$ is made a positive pressure and the second space $2b$ is made a negative pressure similarly to the case of soft. At this time, the pressure in the first space $2a$ is slightly increased than the case of soft.

Further, also in the case of presenting a slightly-hard and relatively-soft haptic sensation to a user, the first space $2a$ is made a positive pressure and the second space $2b$ is made a negative pressure. At this time, the pressure in the first space $2a$ is slightly increased than the case of relatively-soft.

That is, the softness can be fine-adjusted by adjusting the pressure in the first space $2a$.

Further, for example, in the case of presenting a slightly-soft and relatively-hard haptic sensation to a user, the first space $2a$ is made a negative pressure and the second space $2b$ is made a positive pressure. As a result, the second deformable layer $1b$ comes into contact with the first deformable layer $1a$ and the two layers are overlapped with each other (close state), and a slightly-soft and relatively-hard haptic sensation is presented to a user.

Further, in the case of presenting a relatively-hard haptic sensation to a user, the first space $2a$ is made a negative pressure and the second space $2b$ is made a positive pressure (close state) similarly to the case of slightly-soft and relatively-hard. At this time, the pressure in the second space $2b$ is slightly increased than the case of slightly-soft and relatively-hard.

That is, it is possible to fine-adjust the hardness by adjusting the pressure in the second space $2b$.

Further, not only a flexibility sensation but also a temperature sensation (see FIG. 11), vibration (see FIG. 12), or a touch sensation such as unevenness (see FIG. 14) may be presented to a user together with video.

In FIG. 14, an example will be described. For example, as shown in the upper side of FIG. 14, assumption is made that video of a vinyl ball is displayed on the head-mounted display 60 when the first deformable layer $1a$ and the second deformable layer $1k$ are in the separated state. In this case, it is possible to provide, when a user touches the front surface (presentation surface) of the first deformable layer $1a$, a soft and smooth touch sensation as if he/she touched the front surface of the vinyl ball.

Meanwhile, as shown in the lower side of FIG. 14, assumption is made that video of a golf ball is displayed on the head-mounted display 60 when the first deformable layer $1a$ and the second deformable layer $1k$ are in the close state. In this case, it is possible to provide, when a user touches the front surface (unevenness is formed by the second deformable layer $1k$) of the first deformable layer $1a$, a relatively-hard and uneven touch sensation as if he/she touched the front surface of the golf ball.

Here, in FIG. 28, the head-mounted display 60 has been described as an example of an apparatus that presents video to a user. Meanwhile, the apparatus that presents video to a user may be a television apparatus, a monitor, a projector, or the like.

Modified Example 3

Figure 29:
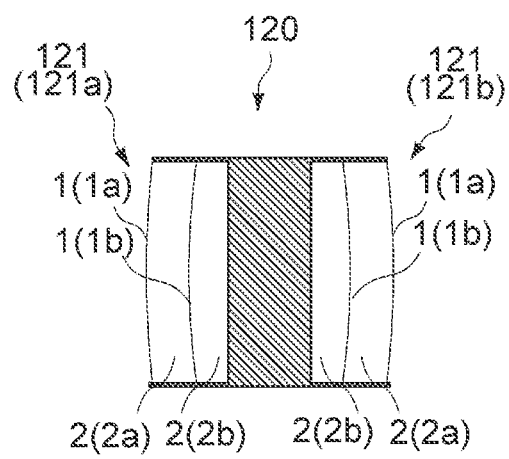
FIG. 29 is a diagram showing a haptic presentation apparatus according to a third modified example.

Next, a third modified example of the present technology will be described. FIG. 29 is a schematic diagram showing a haptic presentation apparatus 120 according to a third modified example.

As shown in FIG. 29, the haptic presentation apparatus 120 according to third modified example includes two haptic presentation units 121 including a first haptic presentation unit 121$a$ and a second haptic presentation unit 121$b$.

The first haptic presentation unit 121$a$ has a two-layer structure including the first deformable layer $1a$, the second deformable layer $1b$, the first space $2a$, and the second space $2b$. Similarly, the second haptic presentation unit 121$b$ has a two-layer structure including the first deformable layer $1a$, the second deformable layer $1b$, the first space $2a$, and the second space $2b$. Note that the first haptic presentation unit 121$a$ and the second haptic presentation unit 121$b$ may have a structure of three or more layers.

The first haptic presentation unit 121$a$ and the second haptic presentation unit 121$b$ are disposed in the orientations opposite to each other by 180°. Further, the two presentation surfaces (front surfaces of the first deformable layer $1a$) for presenting a haptic sensation to a user are disposed in the orientations opposite to each other by 180°.

Typically, the first haptic presentation unit 121$a$ and the second haptic presentation unit 121$b$ each correspond to one of the haptic presentation apparatuses 100 and 105 to 119 described in the above-mentioned embodiments and modified examples.

The haptic presentation apparatus 120 according to the third modified example has, in a sense, a configuration in which two of the haptic presentation apparatuses 100 and 105 to 119 according to the embodiments and modified examples described above are prepared, the two haptic presentation apparatuses are disposed in the orientations opposite to each other by 180°, and the bottom portions 11 (lower layer side) are connected to each other.

The first haptic presentation unit 121a and the second haptic presentation unit 121b have the same configuration in the example shown in FIG. 29, but may have different configurations. For example, the first haptic presentation unit 121a includes the haptic presentation apparatus 100 (see FIG. 1) according to the first embodiment and the second haptic presentation unit 121b may include the haptic presentation apparatus 105 (see FIG. 5) according to the second embodiment.

Figure 30:
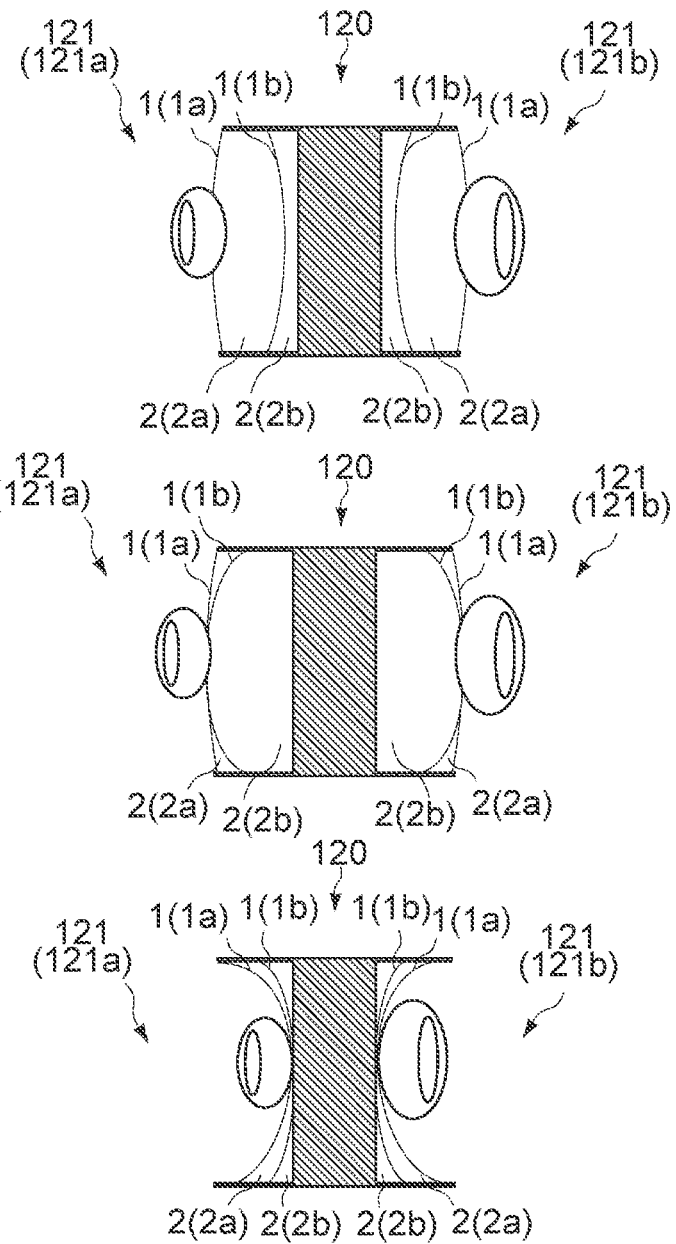
FIG. 30 is a diagram showing how a haptic sensation is presented to a user when the user pinches the haptic presentation apparatus with two fingers.

FIG. 30 a diagram showing how a haptic sensation is presented to a user when the user pinches the haptic presentation apparatus 120 with two fingers.

In the upper diagram of FIG. 30, the first spaces 2a of the first haptic presentation unit 121a and the second haptic presentation unit 121b are made a positive pressure, and the second spaces 2b are made a negative pressure. As a result, it is possible to present, to a user, a touch sensation as if he/she picks up a soft (alternatively, relatively-soft or slightly-hard and relatively-soft) object with two fingers (e.g., the thumb and a finger other than the thumb).

In the central diagram of FIG. 30, the first spaces 2a of the first haptic presentation unit 121a and the second haptic presentation unit 121b are made a negative pressure and the second spaces 2b are made a positive pressure. As a result, it is possible to present, to a user, a touch sensation as if he/she pinches a relatively-hard (alternatively, slightly-soft and relatively hard) object with two fingers.

In the lower diagram of FIG. 30, the first spaces 2a of the first haptic presentation unit 121a and the second haptic presentation unit 121b are made a negative pressure and the second spaces 2b are made a negative pressure. As a result, it is possible to present, to a user, a touch sensation as if he/she pinches a hard and small object with two fingers.

Note that in FIG. 30, the case where the same pressure control is performed in the first haptic presentation unit 121a and the second haptic presentation unit 121b has been described. Meanwhile, different pressure control may be performed in the first haptic presentation unit 121a and the second haptic presentation unit 121b. As a result, it is possible to present different flexibility sensations to two fingers (e.g., a hard touch sensation to one finger and a soft touch sensation to the other finger).

Further, in FIG. 30, the case where the user pinches the haptic presentation apparatus 120 with two fingers has been described. Meanwhile, the user may pinch (pick up) the haptic presentation apparatus 120 with three or more fingers. Further, for example, the user may touch the presentation surface (front surface of the first deformable layer 1a) of one haptic presentation unit 121 with (one to five) fingers of one hand and touch the presentation surface (front surface of the first deformable layer 1a) of the other haptic presentation unit 121 with (one to five) fingers of the other hand.

Here, the second space 2b of the first haptic presentation unit 121a and the second space 2b of the second haptic presentation unit 121b may be communicated with each other.

Figure 31:
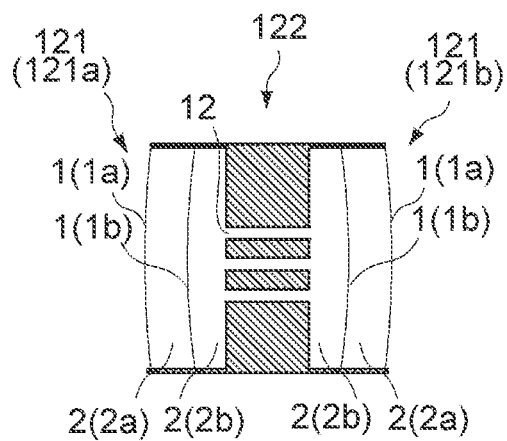
FIG. 31 is a diagram showing an example of the case where a second space of a first haptic presentation unit and a second space of a second haptic presentation unit are communicated with each other.

FIG. 31 is a diagram showing an example of the case where the second space 2b of the first haptic presentation unit 121a and the second space 2b of the second haptic presentation unit 121b are communicated with each other.

As shown in FIG. 31, in a haptic presentation apparatus 122, a plurality of communication ports 12 that communicates the second space 2b of the first haptic presentation unit 121a and the second space 2b of the second haptic presentation unit 121b to each other is provided.

As described above, by communicating the two second spaces 2b to each other, the two second spaces 2b are integrated. Therefore, it is unnecessary to perform control of the pressure in the two second spaces 2b and easily control the pressure (typically, this method is used in the case where the same pressure control is used in the first haptic presentation unit 121a and the second haptic presentation unit 121b).

In the description here, the case where the two presentation surfaces (front surfaces of the first deformable layer 1a) for presenting a haptic sensation to a user are disposed in the orientations opposite to each other by 180° has been described. Meanwhile, this angle is not limited to 180° in the opposite orientation and can be set to an arbitrary angle.

Figure 32:
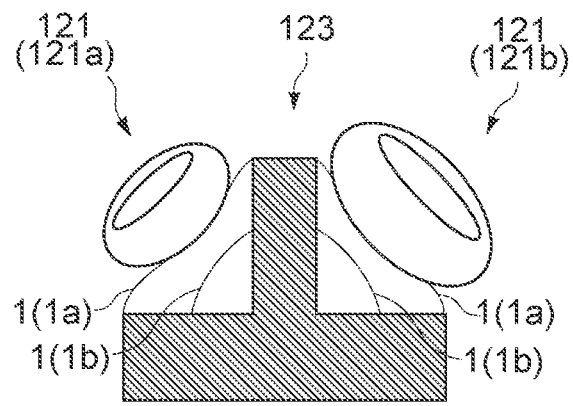
FIG. 32 is a diagram showing an example of the case where two presentation surfaces are set to arbitrary angles.

FIG. 32 is a diagram showing an example of the case where the two presentation surfaces are set to an arbitrary angle. In a haptic presentation apparatus 123 shown in FIG. 32, the presentation surface (front surface of the first deformable layer 1a) of the first haptic presentation unit 121a and the presentation surface (front surface of the first deformable layer 1a) of the second haptic presentation unit 121b are disposed at an angle of 90°.

Further, in the description here, the case where the number of haptic presentation units 121 of the haptic presentation apparatus is two has been described. Meanwhile, the number of haptic presentation units 121 can be arbitrarily set as long as it is two or more.

Figure 33:
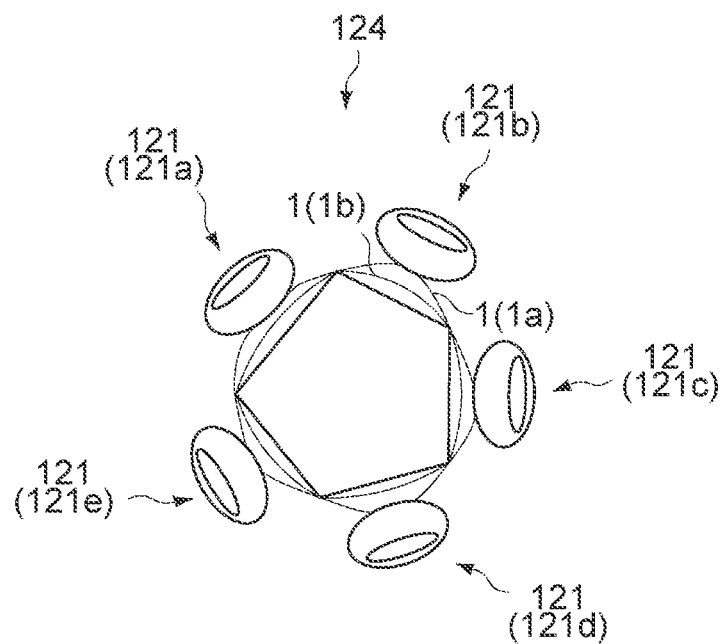
FIG. 33 is a diagram showing an example of the case where the number of haptic presentation units an arbitrary number.

FIG. 33 is a diagram showing an example of the case where the number of haptic presentation units is an arbitrary number. A haptic presentation apparatus 124 shown in FIG. 33 includes five haptic presentation units 121 (121a to 121e) corresponding to five fingers. A user can obtain a touch sensation from the entire five fingers by picking up the haptic presentation apparatus 124 with the five fingers.

The present technology may also take the following configurations.

(1) A haptic presentation apparatus, including:
 a first deformable layer that is positioned on a front surface side;
 a second deformable layer that is positioned inward of the first deformable layer; and
 a drive unit that is driven to control outflow and inflow of fluid between a first space and a second space, the first space retaining the fluid between the first deformable layer and the second deformable layer, the second space retaining the fluid inward of the second deformable layer.

(2) The haptic presentation apparatus according to (1) above, in which
 the drive unit controls outflow and inflow of the fluid to switch a first state and a second state, the first deformable layer and the second deformable layer being separated from each other in the first state, at least part of the second deformable layer and at least part of the second deformable layer being close to each other in the second state.

(3) The haptic presentation apparatus according to (2) above, in which
 the first deformable layer and the second deformable layer have different hardnesses at least in part.

(4) The haptic presentation apparatus according to (3) above, in which
 the first deformable layer and the second deformable layer include close portions that are close to each other in the second state, and
 at least the close portion of the first deformable layer and the close portion of the second deformable layer have different hardnesses.

(5) The haptic presentation apparatus according to (4) above, in which
the close portion of the second deformable layer is harder than the close portion of the first deformable layer.
(6) The haptic presentation apparatus according to (4) above, in which
the close portion of the first deformable layer is harder than the close portion of the second deformable layer.
(7) The haptic presentation apparatus according to any one of (4) to (6) above, in which
one of the close portions of the first deformable layer and the second deformable layer has a Young's modulus of 100 MPa or more and the other close portion has a Young's modulus of less than 100 MPa.
(8) The haptic presentation apparatus according to any one of (2) to (7) above, in which
the first deformable layer and the second deformable layer have different shapes at least in part.
(9) The haptic presentation apparatus according to (8), in which
the first deformable layer and the second deformable layer include close portions that are close to each other in the second state, and
at least the close portion of the first deformable layer and the close portion of the second deformable layer have different shapes.
(10) The haptic presentation apparatus according to (2) above, in which
the first deformable layer and the second deformable layer include close portions that are close to each other in the second state, and
the first deformable layer and the second deformable layer have a fitting mechanism for fitting the close portions to each other in the second state.
(11) The haptic presentation apparatus according to (10) above, in which
the fitting mechanism includes a recessed portion and a projecting portion that fits into the recessed portion, one of the close portions of the first deformable layer and the second deformable layer including the recessed portion, the other close portion including the projecting portion.
(12) The haptic presentation apparatus according to (11) above, further including
a latch mechanism that latches the projecting portion to the recessed portion while the projecting portion fits into the recessed portion.
(13) The haptic presentation apparatus according to (11) or (12) above, further including
a lock mechanism that locks the projecting portion to the recessed portion while the projecting portion fits into the recessed portion.
(14) The haptic presentation apparatus according to any one of (1) to (13) above, in which
at least one of the first deformable layer and the second deformable layer includes a temperature adjustment unit capable of adjusting temperature.
(15) The haptic presentation apparatus according to any one of (1) to (14) above, in which
at least one of the first deformable layer and the second deformable layer includes a vibration unit.
(16) The haptic presentation apparatus according to any one of (1) to (15) above, further including
a sensor unit that acquires information regarding at least one of the first space or the second space.
(17) The haptic presentation apparatus according to any one of (1) to (16) above, in which
the fluid flowing in and out of the first space and the fluid flowing in and out of the second space have different properties.
(18) A fluid control apparatus, including:
a first deformable layer that is positioned on a front surface side;
a second deformable layer that is positioned inward of the first deformable layer; and
a drive unit that controls outflow and inflow of fluid between a first space and a second space to switch a first state and a second state, the first space retaining the fluid between the first deformable layer and the second deformable layer, the second space retaining the fluid inward of the second deformable layer, the first deformable layer and the second deformable layer being separated from each other in the first state, at least part of the second deformable layer and at least part of the second deformable layer being close to each other in the second state.
(19) A fluid control method, including:
controlling outflow and inflow of fluid between a first space and a second space, the first space retaining the fluid between a first deformable layer positioned on a front surface side and a second deformable layer positioned inward of the first deformable layer, the second space retaining the fluid inward of the second deformable layer.
(20) A program that causes a computer to execute the process of:
controlling outflow and inflow of fluid between a first space and a second space, the first space retaining the fluid between a first deformable layer positioned on a front surface side and a second deformable layer positioned inward of the first deformable layer, the second space retaining the fluid inward of the second deformable layer.

REFERENCE SIGNS LIST 1 deformable layer
2 space
10 casing
20 channel portion
30 supply source
40 drive unit
50 control device
100, 105 to 120, 122 to 124 haptic presentation apparatus (fluid control apparatus)

The invention claimed is:
1. A haptic presentation apparatus, comprising:
a first deformable layer on a front surface side;
a second deformable layer that is inward of the first deformable layer; and
a drive unit configured to control outflow and inflow of fluid between a first space and a second space, wherein
the first space retaining the fluid between the first deformable layer and the second deformable layer,
the second space retaining the fluid inward of the second deformable layer, and
a plurality of properties of the fluid flowing in and out of the first space are different from a plurality of properties of the fluid flowing in and out of the second space.
2. The haptic presentation apparatus according to claim 1, wherein the drive unit is further configured to control outflow and inflow of the fluid to switch a first state and a second state, the first deformable layer is separated from the second deformable layer in the first state, and at least part of the first deformable layer is close to at least part of the second deformable layer in the second state.

3. The haptic presentation apparatus according to claim 2, wherein the first deformable layer have different hardness from the second deformable layer at least in part.

4. The haptic presentation apparatus according to claim 3, wherein close portions of the first deformable layer are close to close portions of the second deformable layer in the second state, and at least the close portions of the first deformable layer have different hardness from the close portions of the second deformable layer.

5. The haptic presentation apparatus according to claim 4, wherein the close portions of the second deformable layer is harder than the close portions of the first deformable layer.

6. The haptic presentation apparatus according to claim 4, wherein the close portions of the first deformable layer is harder than the close portions of the second deformable layer.

7. The haptic presentation apparatus according to claim 4, wherein a first close portion of the close portions of the first deformable layer and the second deformable layer has a Young's modulus of at least 100 MPa and a second close portion of the close portions of the first deformable layer and the second deformable layer has a Young's modulus of less than 100 MPa.

8. The haptic presentation apparatus according to claim 2, wherein a shape of the first deformable layer is different from a shape of the second deformable layer at least in part.

9. The haptic presentation apparatus according to claim 8, wherein close portions of the first deformable layer are close to close portions of the second deformable layer in the second state, and at least a shape of the close portion of the first deformable layer is different from a shape of the close portion of the second deformable layer.

10. The haptic presentation apparatus according to claim 2, wherein close portions of the first deformable layer are close to close portions of the second deformable layer in the second state, and the first deformable layer and the second deformable layer have a fitting mechanism, the close portions of the first deformable layer is fit to the close portions of the second deformable layer by the fitting mechanism.

11. The haptic presentation apparatus according to claim 10, wherein the fitting mechanism includes a recessed portion and a projecting portion that fits into the recessed portion, a first close portion of the close portions of the first deformable layer and the second deformable layer including the recessed portion, a second close portion of the close portions including the projecting portion.

12. The haptic presentation apparatus according to claim 11, further comprising a latch mechanism that latches the projecting portion to the recessed portion while the projecting portion fits into the recessed portion.

13. The haptic presentation apparatus according to claim 11, further comprising a lock mechanism that locks the projecting portion to the recessed portion while the projecting portion fits into the recessed portion.

14. The haptic presentation apparatus according to claim 1, wherein at least one of the first deformable layer and the second deformable layer includes a temperature adjustment unit capable of adjusting temperature.

15. The haptic presentation apparatus according to claim 1, wherein at least one of the first deformable layer and the second deformable layer includes a vibration unit.

16. The haptic presentation apparatus according to claim 1, further comprising a sensor unit configured to acquire information regarding at least one of the first space or the second space.

17. A fluid control apparatus, comprising:

a first deformable layer on a front surface side;

a second deformable layer that is inward of the first deformable layer; and a drive unit configured to control outflow and inflow of fluid between a first space and a second space to switch a first state and a second state, wherein the first space retaining the fluid between the first deformable layer and the second deformable layer, the second space retaining the fluid inward of the second deformable layer, the first deformable layer is separated from the second deformable layer in the first state, at least part of the first deformable layer is close to at least part of the second deformable layer in the second state, and a plurality of properties of the fluid flowing in and out of the first space are different from a plurality of properties of the fluid flowing in and out of the second space.

18. A fluid control method, comprising:

controlling outflow and inflow of fluid between a first space and a second space, wherein the first space retaining the fluid between a first deformable layer on a front surface side and a second deformable layer inward of the first deformable layer, the second space retaining the fluid inward of the second deformable layer, and a plurality of properties of the fluid flowing in and out of the first space are different from a plurality of properties of the fluid flowing in and out of the second space.

19. A non-transitory computer-readable medium having stored thereon, computer-executable instructions which, when executed by a computer, causes the computer to execute operations, the operations comprising:

controlling outflow and inflow of fluid between a first space and a second space, wherein the first space retaining the fluid between a first deformable layer on a front surface side and a second deformable layer inward of the first deformable layer, the second space retaining the fluid inward of the second deformable layer, and a plurality of properties of the fluid flowing in and out of the first space are different from a plurality of properties of the fluid flowing in and out of the second space.

* * * * *